United States Patent [19]

Klein

[11] Patent Number: 5,796,349
[45] Date of Patent: Aug. 18, 1998

[54] SYSTEM AND METHOD FOR MONITORING WEAR OF AN AXIAL BEARING

[75] Inventor: Manfred P. Klein, Highland Park, Ill.

[73] Assignee: Ansimag Inc., Elk Grove Village, Ill.

[21] Appl. No.: 717,196

[22] Filed: Sep. 18, 1996

Related U.S. Application Data

[62] Division of Ser. No. 405,728, Mar. 17, 1995, Pat. No. 5,599,112.

[51] Int. Cl.⁶ ............................................. G08B 21/00
[52] U.S. Cl. .......................... 340/682; 340/648; 384/276; 384/282; 384/420; 384/448; 384/624; 417/423.12; 116/208; 310/90; 73/7
[58] Field of Search ............................ 340/648, 682; 384/624, 276, 420, 282, 102, 248, 251, 297, 368, 627, 125, 129, 448; 417/423.12; 116/208; 310/30, 68 R; 73/7

[56] References Cited

U.S. PATENT DOCUMENTS

| | | | |
|---|---|---|---|
| 2,994,570 | 8/1961 | Cousino | 308/163 |
| 3,102,759 | 9/1963 | Stewart | 308/1 |
| 3,678,883 | 7/1972 | Fischer | 116/114 Q |
| 3,722,375 | 3/1973 | Sievenpiper | 92/168 |
| 3,797,451 | 3/1974 | Tiraspolsky et al. | 116/114 |
| 3,897,116 | 7/1975 | Carpenter | 308/1 A |
| 4,074,575 | 2/1978 | Bergman et al. | 73/344 |
| 4,082,380 | 4/1978 | Klaus et al. | 308/163 |
| 4,302,963 | 12/1981 | Collins | 73/9 |
| 4,320,431 | 3/1982 | Bell | 361/23 |
| 4,606,653 | 8/1986 | Ehrentraut et al. | 384/283 |
| 4,658,643 | 4/1987 | Nakayama et al. | 73/119 R |
| 4,726,695 | 2/1988 | Showalter | 384/121 |
| 5,139,350 | 8/1992 | Gieseler et al. | 384/420 |
| 5,160,246 | 11/1992 | Horiuchi | 417/365 |
| 5,198,763 | 3/1993 | Konishi | 324/207.23 |
| 5,255,984 | 10/1993 | Ide | 384/122 |
| 5,277,500 | 1/1994 | Keck | 384/204 |
| 5,277,543 | 1/1994 | Noguchi et al. | 415/118 |
| 5,336,996 | 8/1994 | Rusnack | 324/207.2 |
| 5,356,273 | 10/1994 | Nixon | 417/423.12 |
| 5,599,112 | 2/1997 | Klein | 384/624 |
| 5,617,339 | 4/1997 | Smith | 364/569 |
| 5,621,159 | 4/1997 | Brown et al. | 73/9 |

Primary Examiner—Nina Tong
Attorney, Agent, or Firm—Darin E. Bartholomew

[57] ABSTRACT

The axial bearing includes a first ring and a second ring. During operation of the axial bearing, the first ring rotates with respect to the second ring. Over time the foregoing rotation produces wear of the first ring; consequently, exposes layers of the first ring to the second ring. The different layers of the first ring produce variations in the coefficient of friction within the axial bearing. If the axial bearing is associated with a drive motor, then the variations in the coefficient of friction change the load on the drive motor. The change in load upon the drive motor may be monitored to indicate axial bearing wear or the need for axial bearing replacement.

26 Claims, 20 Drawing Sheets

SYSTEM AND METHOD FOR MONITORING WEAR OF AN AXIAL BEARING

This is a division of serial number 08/405,728, filed on Mar. 17, 1995, is now patented with U.S. Pat. No. 5,599,112.

FIELD OF THE INVENTION

The present invention relates generally to an axial bearing for a centrifugal pump, a system for monitoring the wear of the axial bearing, and a method for monitoring the wear of the axial bearing. Particularly, the present invention relates to an axial bearing having a variable coefficient of friction for monitoring the wear of the axial bearing, which is incorporated into a magnetic-drive centrifugal pump.

BACKGROUND ART

Axial bearings for centrifugal pumps typically have a first thrust ring and a second thrust ring. The first thrust ring rotates relative to the second thrust ring. Axial bearings may be lubricated by the pumped fluid (i.e. product lubricated). The first thrust ring is frequently made of plastic resin, while the second thrust ring is made of a ceramic material. The first thrust ring wears more rapidly than the second thrust ring because the ceramic material is harder than the plastic resin. The first thrust ring needs to be replaced regularly, but the exact replacement time is difficult to determine. Predicting the longevity of the first thrust ring and the axial bearing depends on factors such as impurities in the pumped fluid, the viscosity of the pumped fluid, and the operating point of the pump. Presently, pump operators and users rely on the time-consuming disassembly and inspection of the centrifugal pump to determine when the first thrust ring or the axial bearing needs replacement. Disassembly of centrifugal pumps may be disruptive to manufacturing processes if, for example, a redundant pump is not incorporated into the manufacturing process.

Some background art pumps add electrical sensors to the axial bearings to gauge replacement times for the thrust rings. However, the addition of electrical sensors frequently means the addition of a seal, a gasket, and/or sealant where the leads for the electrical sensors enter the housing. As a result, a centrifugal pump having an electrical sensor may be prone to leak where the leads enter the housing. Moreover, the electrical sensors may be incompatible with the caustic chemicals frequently pumped by the centrifugal pump. Electrical sensors may be oxidized, corroded, or otherwise rendered inoperable over time.

Therefore, a need exists for an axial bearing which is capable of providing an indication of the need for the axial bearing's replacement, without the foregoing disadvantages of fluid leakage or indicator failure.

SUMMARY OF THE INVENTION

The axial bearing of the present invention includes a first ring and a second ring. During operation of the axial bearing, the first ring rotates with respect to the second ring. Over time the foregoing rotation produces wear of the first ring; consequently, exposes one or more layers of the first ring to the second ring. The different layers of the first ring produce variations in the coefficient of friction within the axial bearing. If the axial bearing is associated with a drive motor, then the variations in the coefficient of friction change the load on the drive motor. The change in load upon the drive motor may be monitored to indicate axial bearing wear or the need for axial bearing replacement.

The first ring has at least two different layers, namely, a first wearing layer and a frictional layer. The first wearing layer is annular and is preferably made from a plastic or a polymer, such as a fluoroplastic. The first wearing layer extends from a first face, which is an exterior mating surface, to the frictional layer. The frictional layer is annular and is disposed in an interior of the first ring adjacent to and beneath the first wearing layer.

The frictional layer has a frictional region and may have a remanent region. The frictional region is constructed from an elastomer, a metal, a ceramic, a plastic composite, a polymer composite, or a particulate composite. If the frictional region is made from an elastomer, then the frictional region optionally has a frictional region thickness which is selected to wear away after several hours of normal operation of the axial bearing to expose a second wearing layer. The frictional region may comprise cylindrical pads, an annular pad, or curved members to optimize the surface area of the frictional region. The surface area of the frictional region may be limited to prevent binding of the axial bearing and excessive overloading of various drive motors. The remanent region is preferably constructed from the same material as the first wearing layer.

If the axial bearing is incorporated into a centrifugal pump, the first ring rotates with respect to the second ring causing the first ring to wear. After the first ring wears sufficiently to expose the frictional layer, the axial bearing places an additional load on the drive motor of the centrifugal pump. The additional load results from the frictional layer of the first ring interacting with the second ring to produce a higher coefficient of friction than the first wearing layer, in conjunction with the second ring, previously produced. For example, when the first wearing layer is exposed to the second ring the coefficient of kinetic friction may range from approximately one hundredth to five hundredths. In contrast, when the frictional layer is exposed to the second ring the coefficient of kinetic coefficient of friction may exceed one.

If the drive motor on the pump is equipped with an energy monitoring circuit, for example, a power monitoring circuit, then a user or pump operator can detect the change in the load placed upon the drive motor by the exposure of the frictional layer. The energy monitoring circuit may trigger an alarm or remove power to the drive motor. Consequently, the user may be alerted of the potential wear of the axial bearing without the burdensome disassembly of the centrifugal pump and inspection of the axial bearing. If the frictional layer thickness is selected so that the frictional layer wears off after a time period, then the load on the drive motor can return to a normal load while the first bearing operates on the exposed second wearing layer. The pump operator can then schedule pump maintenance for future axial bearing replacement at a convenient time.

BRIEF DESCRIPTION OF THE DRAWINGS

FIG. 4 shows a cross-sectional view of the second embodiment of the first ring along reference line 4—4 of FIG. 3, wherein the cylindrical pads are made from a metal, a polymer composite, plastic composite, a particulate composite, or the like.

DETAILED DESCRIPTION

Figure 1:
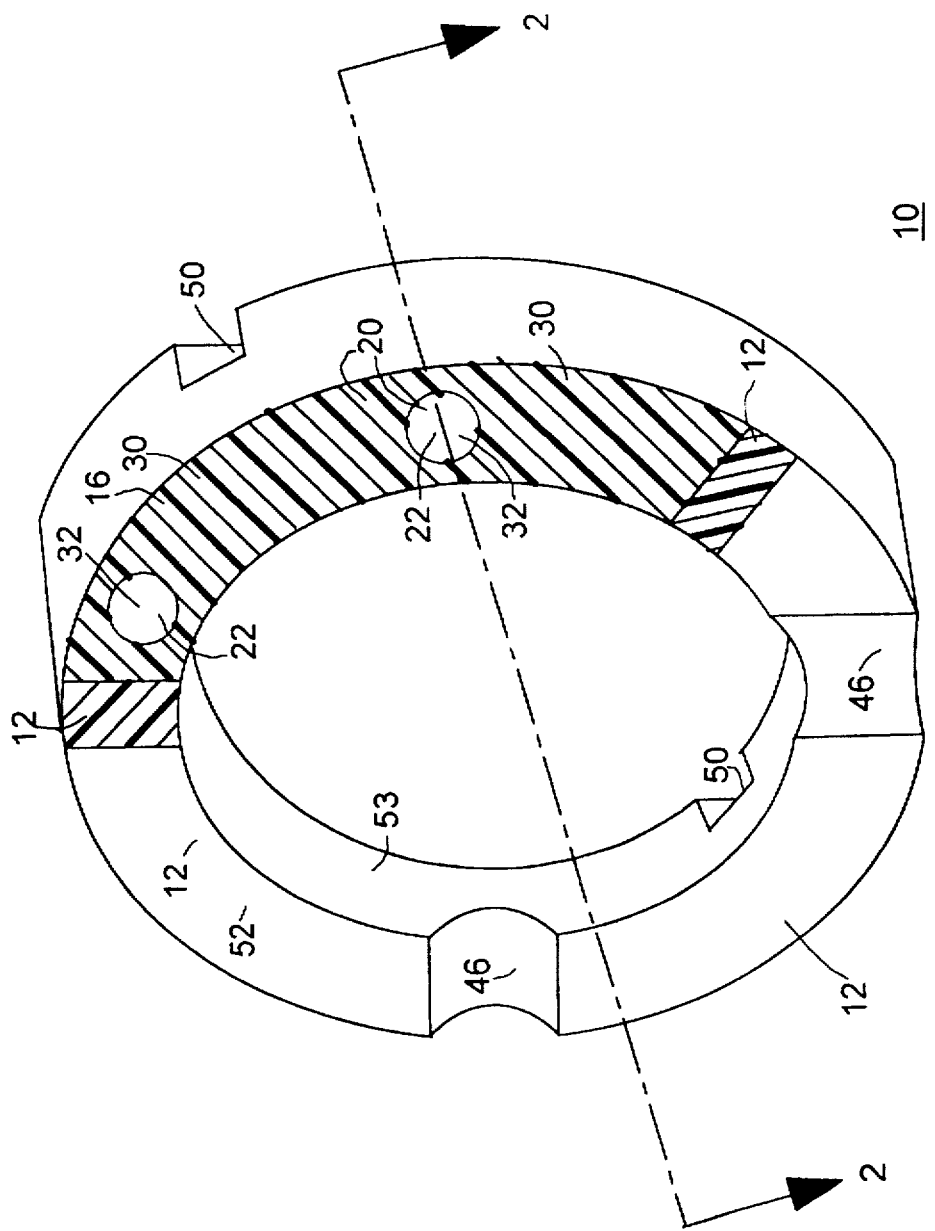
FIG. 1 shows a perspective view of a first embodiment of the first ring with a portion cut-away to reveal the functional layer, which includes cylindrical pads.

The axial bearing of the present invention includes a first ring and optimally a second ring. The first ring may be sold as a replacement part for various centrifugal pumps and magnetic-drive centrifugal pumps. In practice, the first ring may be referred to as a thrust ring, a mouth ring, a disk, an axial bearing, a wear ring, or the like.

FIG. 1 through FIG. 10 show five embodiments of the first ring. All embodiments of the first ring have a first wearing layer 12 and a frictional layer 20. The first wearing layer 12 is substantially annular and is made from a plastic, a resin, or a polymer. The first wearing layer 12 extends from a first face 52 to the frictional layer 20.

The frictional layer 20 is annular and is disposed in an interior, or subsurface, of the first ring. The frictional layer 20 has a frictional region 22 and may have a remanent region 30. The frictional region 22 may be constructed from a diverse assortment of materials, such as elastomers, metals, stainless steel, plastic composites, plastic laminates, polymer composites, polymer laminates, or a particulate composites. The remanent region 30 is optimally constructed from the same plastic, polymer, or resin as the first wearing layer 12.

Figure 3:
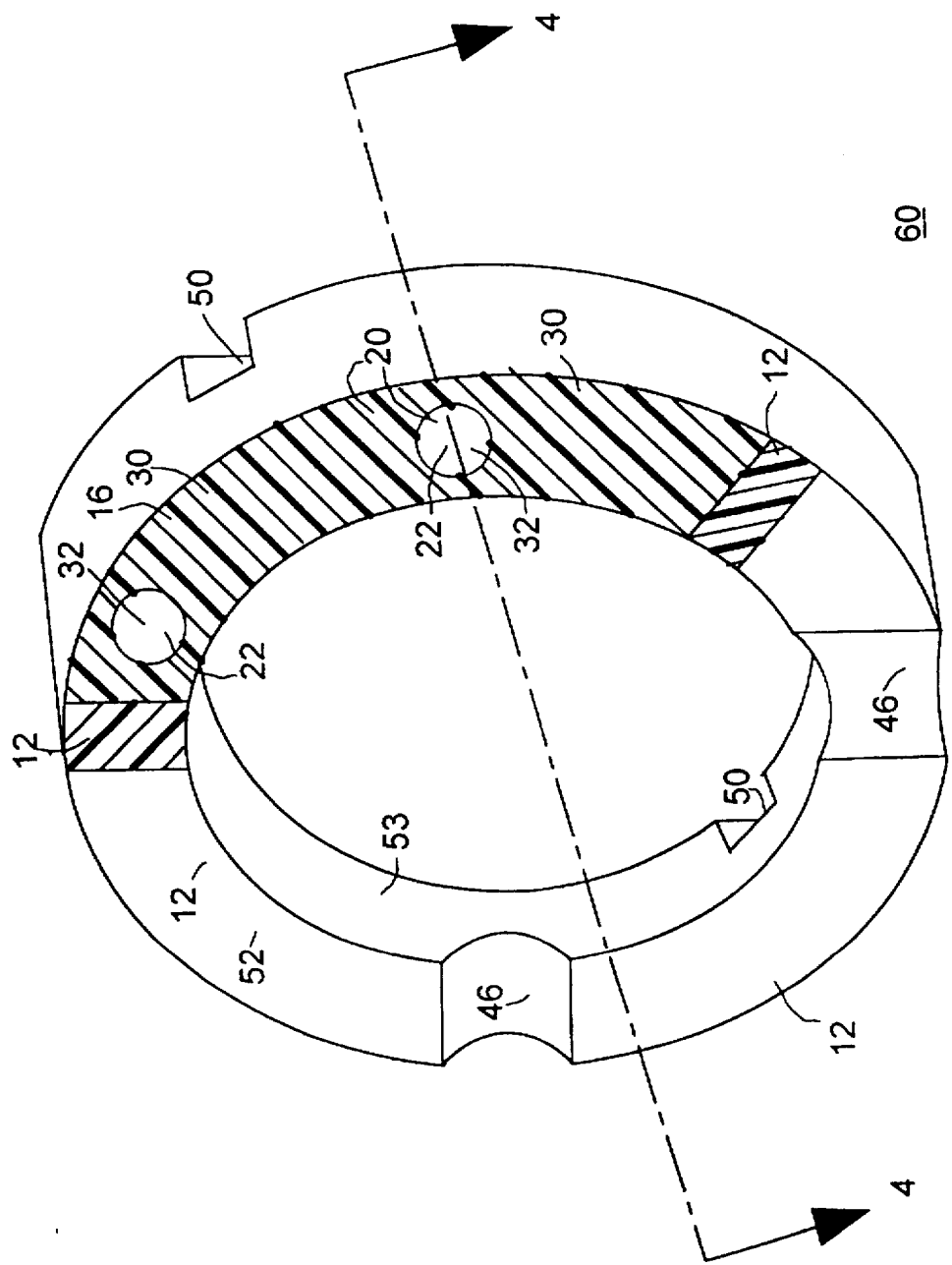
FIG. 3 shows a perspective view of a second embodiment of the first ring with a portion cut-away to reveal the frictional layer, which includes cylindrical pads.
Figure 5:
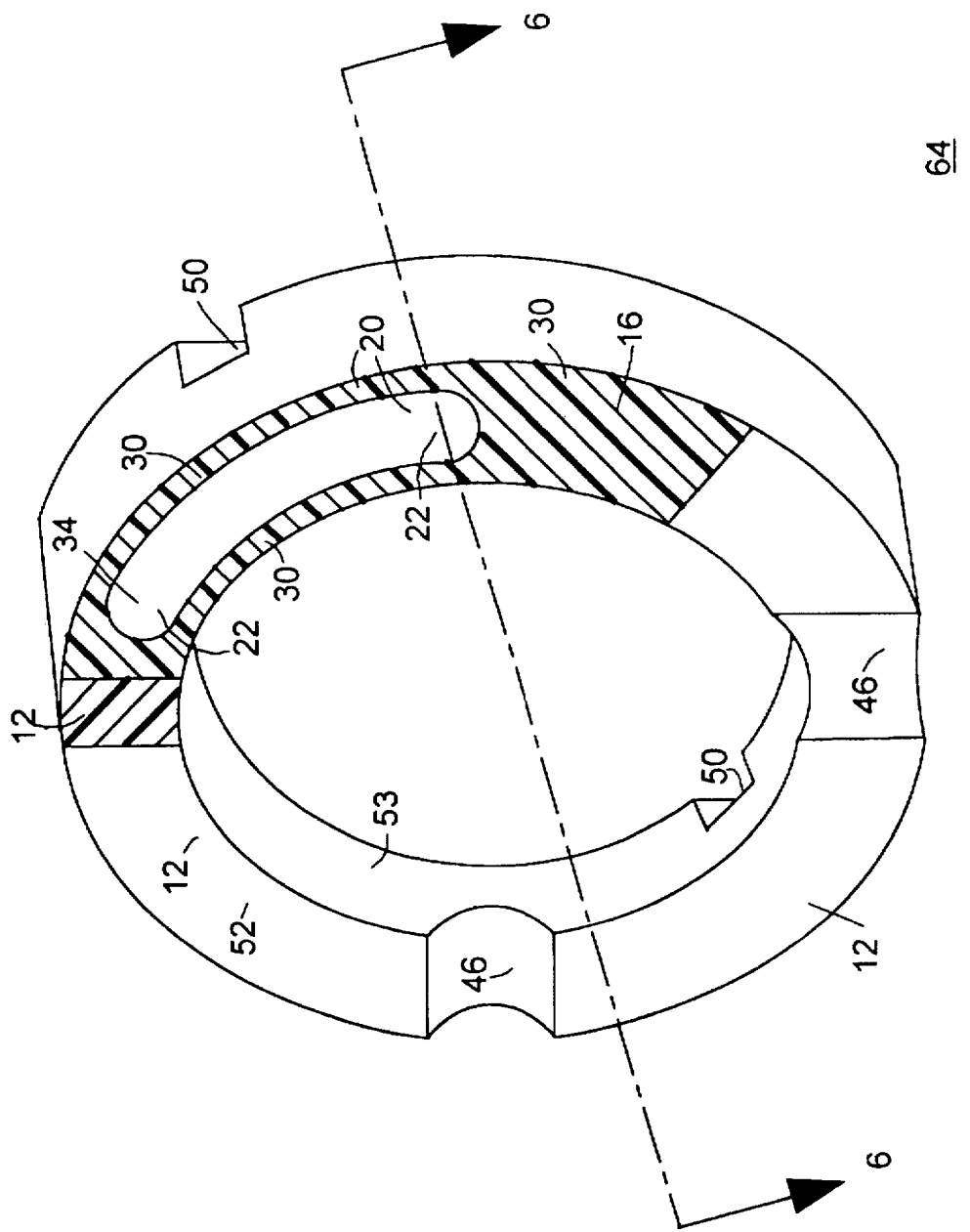
FIG. 5 shows a perspective view of the third embodiment of the first ring with a portion cut-away to reveal the frictional layer, which includes a curved hollow member.
Figure 7:
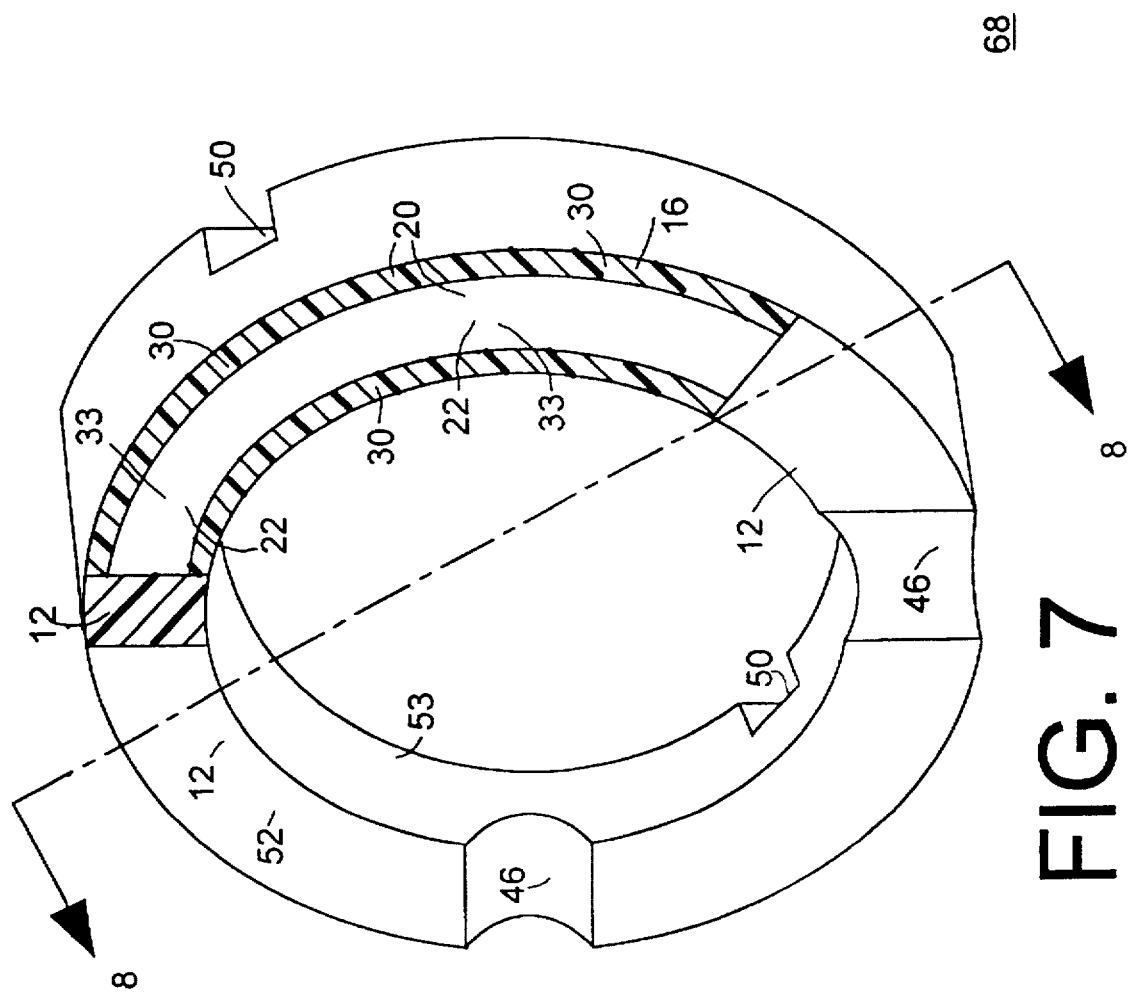
FIG. 7 shows a perspective view of a fourth embodiment of the first ring with a portion cut-away to reveal the frictional layer, which includes an annular pad.
Figure 9:
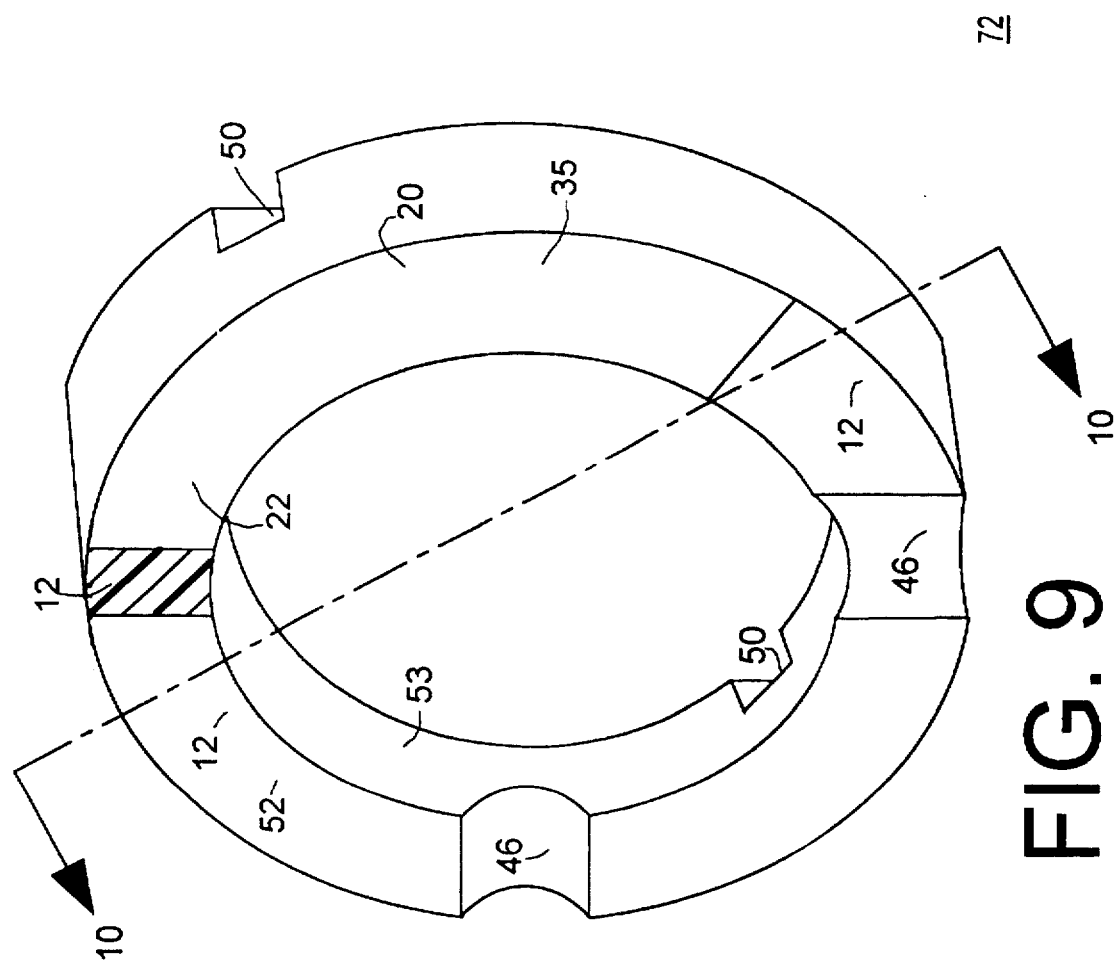
FIG. 9 shows a perspective view of a fifth embodiment of the first ring with a portion cut-away to reveal the frictional layer, which includes an annular pad.

The frictional region 22 differs in the shape, orientation, and the material composition depending upon the particular embodiment. For example, in the first embodiment and the second embodiment of the first ring, the frictional region 22 may comprise a plurality of cylindrical pads 32, as illustrated in FIG. 1 and FIG. 3, respectively. In the third embodiment of the first ring the frictional region 22 comprises a plurality of curved members 34, as illustrated in FIG. 5. In the fourth and fifth embodiments of the first ring, the frictional region comprises an annular pad 33 or an annular pad 35, as illustrated in FIG. 7 and FIG. 9, respectively. The surface area of the frictional region 22 is selected to prevent internal binding of the axial bearing and overloading of a drive motor.

Figure 13:
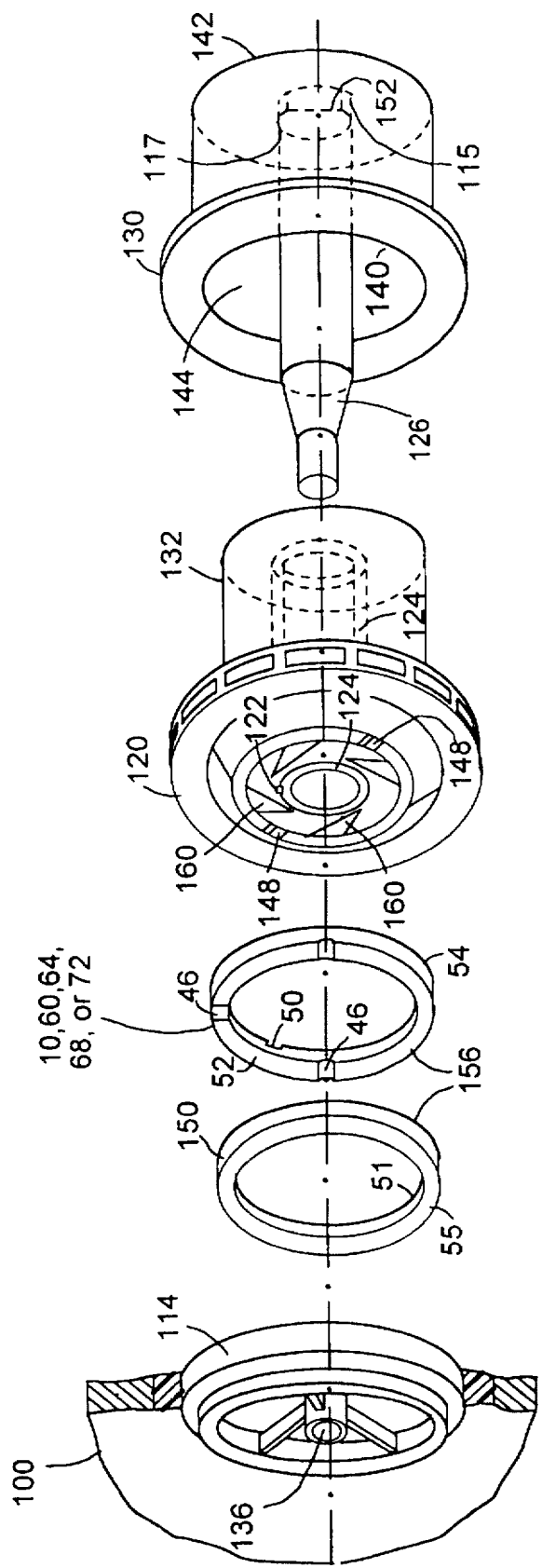
FIG. 13 shows a perspective exploded view of an axial bearing incorporated into a magnetic-drive centrifugal pump with only a portion of the pump interior depicted.

When the axial bearing is incorporated into a centrifugal pump, as shown, for example, in FIG. 13, the first ring is operably associated with the second ring 150. The first ring adjoins the second ring 150 at the bearing interface 156. The first ring rotates with respect to the second ring 150 causing the first ring to wear. When the first ring wears a predetermined amount, the frictional layer 20 is exposed; hence, the friction coefficient of the bearing interface 156 is increased. The friction coefficient of the bearing interface 156 increases as a result of the interaction between the frictional layer 20 and the second ring 150, which replaced the previous interaction between the first wearing layer 12 and the second ring 150.

The axial bearing may operate with various coefficients of friction as determined by the materials and the geometries of the materials at the bearing interface 156. A first coefficient of friction results from the selection of the geometries and materials of the first wearing layer 12 and a first side 51 of the second ring 150. The first coefficient of friction is preferably less than one-quarter when a lubricating fluid is present at the bearing interface 156. A second coefficient of friction results from the selection of the geometries and materials of the frictional layer 20 and the first side 51. The second coefficient of friction is preferably greater than or equal to one, regardless of whether or not lubricating fluid is present. A third coefficient of friction results from the selection of the geometries and materials of the first side 51 and an optional second wearing layer 26. The third coefficient of friction is preferably less than one-quarter when lubricating fluid is present. A bearing interface 156 that yields both a first coefficient of friction and a second coefficient of friction over time comprises frictional means for changing the coefficient of friction of the bearing over its lifetime. The frictional means may also include a bearing interface 156 which yields a third coefficient of friction.

First Embodiment of the First Ring

Figure 2:
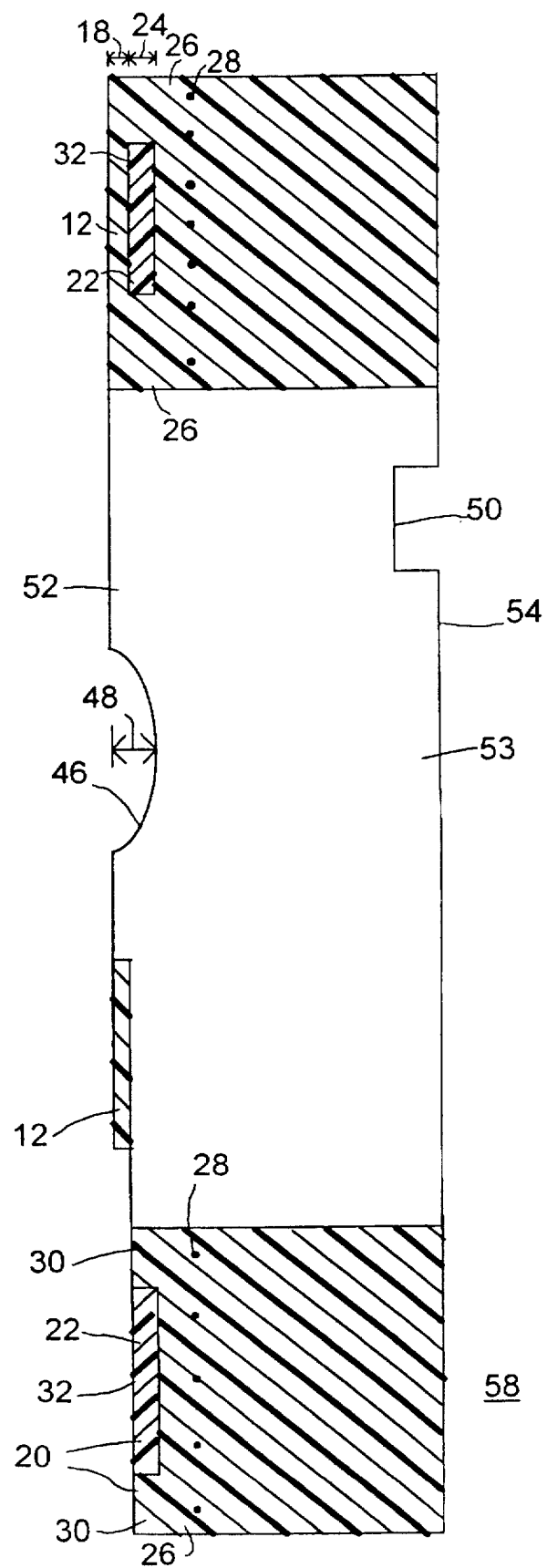
FIG. 2 shows a cross-sectional view of the first embodiment of the first ring along reference line 2—2 of FIG. 1, wherein the cylindrical pads are made from an elastomer.

FIG. 1 and FIG. 2 show the first embodiment of the first ring, which is designated as first ring (first embodiment) 10.

The cross-section in FIG. 2 is shown with the same portion of the first ring (first embodiment) 10 removed as shown in FIG. 1. The first ring cross section (first embodiment) 58 is symmetrical. However, as illustrated in FIG. 2, the first ring cross section 58 appears unsymmetrical because the first ring (first embodiment) 10 is unsymmetrically cut away.

The first ring 10 (first embodiment) has a first wearing layer 12 and a frictional layer 20. The first wearing layer 12 is preferably constructed from a polymer, resin or plastic, such as polytetrafluoroethylene (PTFE) or carbon-fiber filled polytetrafluoroethylene. When the axial bearing operates, the first wearing layer 12 is diminished and removed from abrasion and rotational movement of a second ring (not shown in FIG. 1) which axially adjoins the first ring (first embodiment) 10.

The first wearing layer 12 has a first wearing layer depth 18 that extends an axial distance beneath a first face 52. The first wearing layer depth 18 ranges from fifty percent to one-hundred percent of the entire wear allowance or wear limit. The wear limit, or the total wear allowance, represents the maximum permissible axial wear of the first ring (first embodiment) 10. If the first ring (first embodiment) 10 wears greater than the wear limit, additional clearances in the axial bearing may prevent effective operation of the bearing. In practice, the wear limit may be equivalent to an axial distance ranging from approximately forty thousandths of an inch to sixty thousands of an inch below the original first face 52, as manufactured.

In FIG. 2, the first wearing layer depth 18 is approximately fifty percent of the total wear allowance. In practice, fifty percent of the total wear allowance may range from twenty thousandths of an inch to thirty thousandths of an inch below the initial first face 52. The first wearing layer 12 typically has radial grooves 46 which extend a radial groove depth 48 into the first ring 10. In a preferred embodiment, the radial groove depth 48 is equal to the wear limit. Hence, the radial groove 46 provides a visual indication of axial bearing longevity if a pump, incorporating the first ring, is disassembled and inspected.

The frictional layer 20 is substantially annular layer which is disposed adjacent to and beneath the first wearing layer 12. The frictional layer 20 has a frictional region 22 and a remanent region 30. The frictional region 22 in FIG. 2 comprises a plurality of cylindrical pads 32. The remanent region 30 has boundaries defined by the area remaining in the annular frictional layer 20 after the frictional region 22 is considered. The frictional region 22 in FIG. 2 is preferably oriented near or at fifty percent of the wear limit. The frictional region 22 of the first ring (first embodiment) 10 is optimally constructed from an elastomer.

An appropriate elastomer may be selected based on the chemical resistance properties of the elastomer while considering the chemical content of the pumped fluid. In addition compressive strength, tensile strength, hardness, and abrasive characteristics may be taken into consideration. Poor resistance to abrasion may actually be desirable where the elastomer is selected to wear away at the bearing interface within several hours of normal operation. Elastomers include various types of natural and synthetic rubbers, which generally have elastic properties. Elastomers include natural rubber, styrene butadiene, isobutene isoprene, chlorinated isobutane isoprene, ethylene propylene copolymer, ethylene propylene terpolymer, chlorosulfonated polyethylene, chloroprene, neoprene, chlorinated polyethylene, nitrile butadiene, epichloro-hydrin, polyacrylate silicone, silicone, urethane, fluorosilicone, fluorocarbon and perfluorocarbon materials. Among these elastomers, fluorocarbon and ethylene propylene terpolymer are preferably used in the first ring (first embodiment) 10. Other elastomers, such as nitrile butadiene and fluorosilicone, offer comprehensively good chemical resistance. In addition, fluorosilicone has poor resistance to abrasion; consequently, fluorosilicone is suitable for making cylindrical pads 32 which are designed deliberately wear off the first ring (first embodiment) 10 during normal operation of the pump.

Each of the cylindrical pads 32 optimally has a frictional region thickness 24 which is selected to wear away after selected duration of normal operation. The frictional region thickness 24 is preferably selected to wear away during normal operation for a duration of one to eight hours. The elastomer used for the cylindrical pads 32 should be susceptible to abrasion from the second ring so that frictional region thickness 24 is proportional to the duration during which the load on the drive motor of the pump is increased. The first ring (first embodiment) 10 is preferably tested in conjunction with a second ring under various test conditions to establish an appropriate frictional region thickness 24 of a particular elastomer. Test conditions must consider the rotational velocity of the first ring (first embodiment) 10 with respect to the second ring and axial forces applied to the first ring 10 among other factors. In practice, the frictional region thickness 24 may, for example, measure approximately five thousandths of an inch of fluorocarbon elastomer in order to wear away after a reasonable time during normal operation. After the frictional region 22 wears away a second wearing layer 26 is exposed.

The second wearing layer 26 extends to a second wearing layer depth 28, which is equivalent to at least one-hundred percent of the entire wear allowance or at least the wear limit. The second wearing layer depth 28 is delineated by the dotted lines in FIG. 2. The second wearing layer 26 permits the axial bearing to continue operating even after the first wearing layer 12 and the frictional layer 20 wear away from the first ring 10. The first ring (first embodiment) 10 is used in situations where the pump operator requires or prefers an advanced warning before axial bearing replacement (i.e. first ring replacement) is required. Servicing of the pump can be scheduled while the axial bearing is operating in an appropriate fluid-film lubrication regime upon the exposed second wearing layer 26. Therefore, critical manufacturing processes and operations can be optimized by scheduling maintenance of the pump for convenient times to avoid disturbances in the manufacturing processes.

During normal operation initially the first wearing layer 12 has a coefficient of kinetic friction which is sufficiently low to permit operation in the full film lubrication regime and to minimize operation in the boundary film lubrication regime. For example, under normal operating conditions in the axial bearing, the first ring (first embodiment) 10 and the second ring will operate with a friction coefficient ranging from one hundredth (0.01) to five hundredths (0.05). Once the first wearing layer 12 is removed from the first ring 10 by normal wear of the first face 52 contacting the second ring, then the frictional layer 20 is exposed. The frictional layer 20 has a coefficient of friction determined primarily by the exposed surface area and the exposed material of the frictional region 22. The frictional region 22, as defined by the cylindrical pads 32, may have a frictional coefficient exceeding one with respect to second ring where the cylindrical pads 32 are made from an elastomer and where the second ring is made from a ceramic material. When the bearing interface is wet or lubricated in the full film lubrication regime the frictional coefficient is approximately one.

Referring to FIG. 1 and FIG. 2, the first ring (first embodiment) 10 has a first face 52 and a second face 54. The first face 52 is movably associated with the second ring. The second face 54 has at least one notch 50 for attachment to a rotational member such as a pump impeller or a shaft. In alternative embodiments, the notch 50 may be located in a cylindrical surface 53 to facilitate the coupling of the first ring 10 to the rotational member.

Second Embodiment of the First Ring

Figure 4:
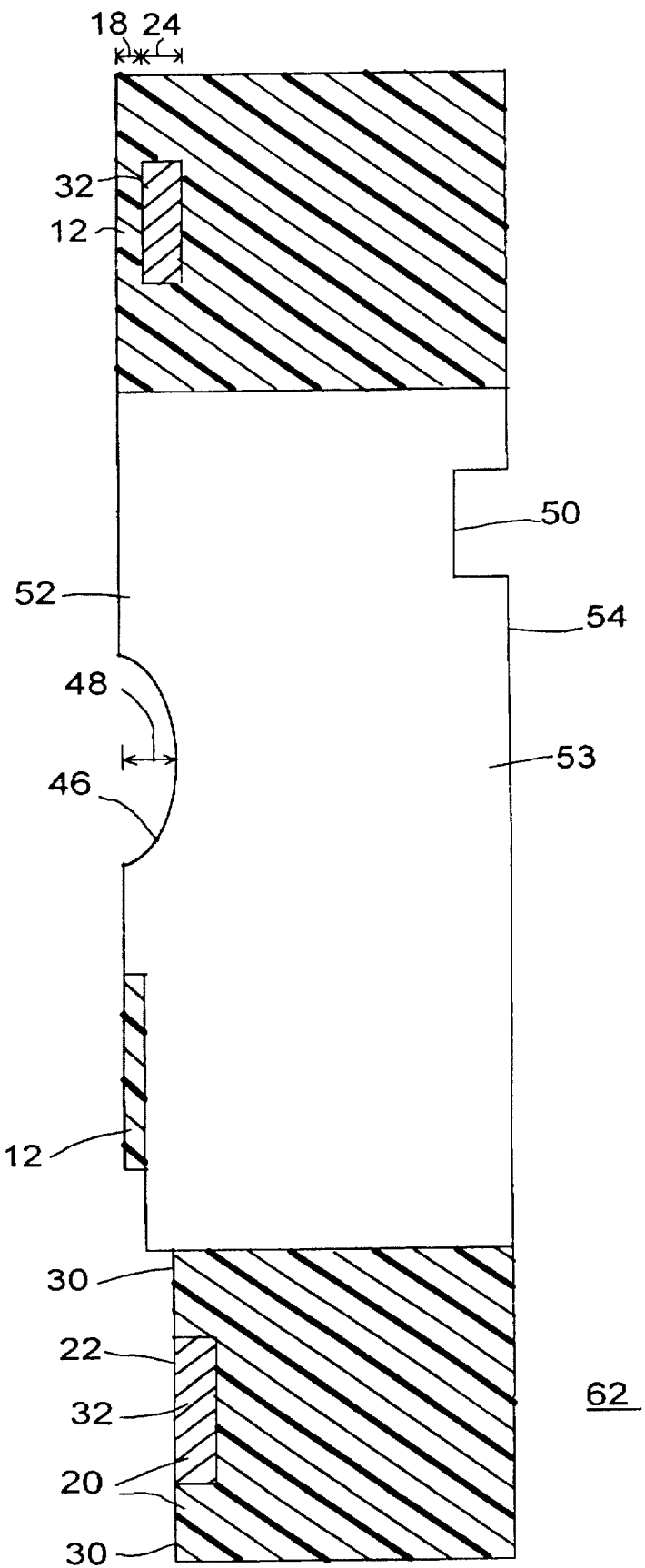

The second embodiment of the first ring is shown in FIG. 3 and FIG. 4. The perspective view of the second embodiment of the first ring is similar to the perspective view of the first embodiment as shown in FIG. 1. The differences between the first embodiment and the second embodiment of the first ring become apparent when the cross-sectional view of FIG. 4 is considered. The first ring (second embodiment) is designated by reference numeral 60. The first ring cross section (second embodiment) is referenced by reference numeral 62.

As best illustrated in FIG. 4, the cylindrical pads 32 of the first ring (second embodiment) 60 are oriented near the wear limit; the frictional region 22 is preferably constructed from stainless steel or from a polymer composite reinforced with metallic fiber. Other suitable materials for the cylindrical pads 32 include ceramic material, a ceramic composite, a polymer composite, a plastic composite, a plastic laminate, a polymer laminate, a polymer-particulate composite, a plastic-particulate composite, a metal, an alloy, or the like. The first wearing layer depth 18 optimally extends to the wear limit. The frictional region 22 of the first ring (second embodiment) 60 is not designed to wear away during normal operation. As a result, no second wearing layer is required in the first ring (second embodiment) 60.

The second ring (shown as a second ring 150 in FIG. 13) of the axial bearing is optimally constructed from a ceramic material, such as silicon carbide. The first wearing layer 12 is dissipated or removed by abrasion of the silicon carbide against the first face 52 after a period of normal wear. As a result, the stainless steel of the frictional layer 20 is exposed at the bearing interface. The stainless steel and the silicon carbide subsequently produce a higher coefficient of friction than the coefficient of friction formerly produced by the first wearing layer 12 and the silicon carbide. The higher coefficient of friction even results when the steel-silicon carbide interface is well-lubricated or wetted by the pumped product. However, the frictional interaction between the first ring (second embodiment) 60 and the second ring may result in the destruction of bearing interface surfaces of the first ring (second embodiment) 60 and the second ring. Hence, replacement of the first ring as well as the second ring may be required where the first ring (second embodiment) 60 is utilized.

Third Embodiment of the First Ring

Figure 6:
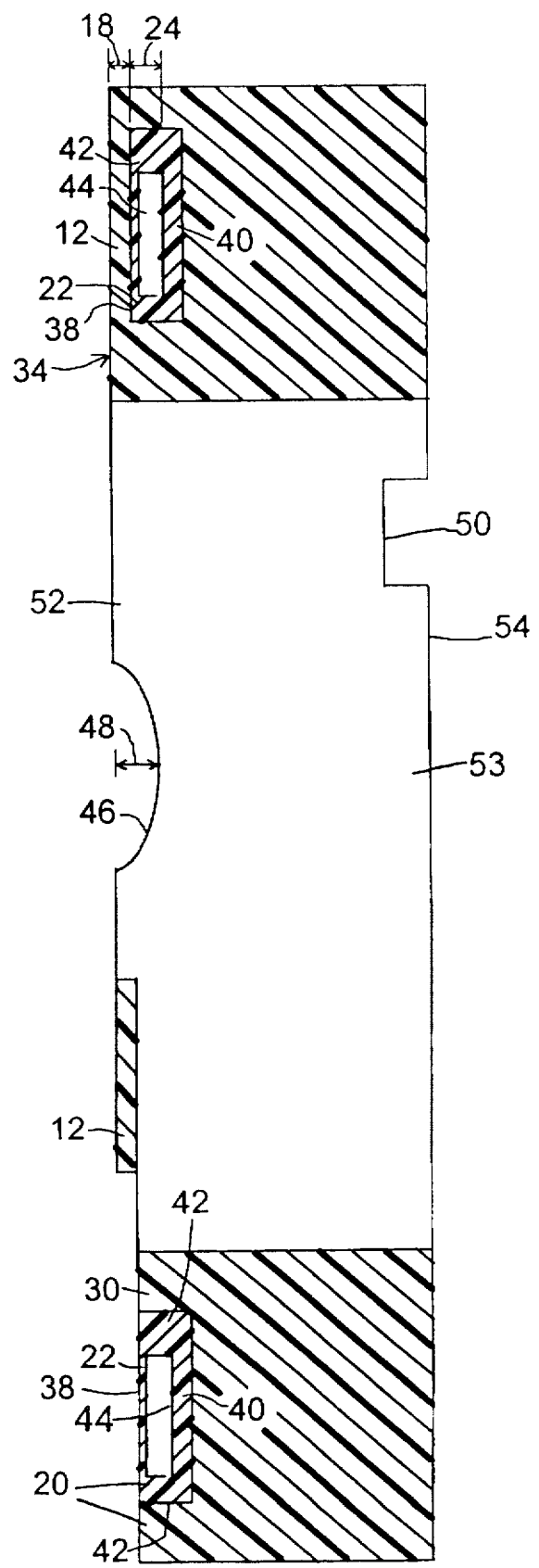
FIG. 6 shows a cross-sectional view of the third embodiment of the first ring along reference line 6—6 of FIG. 5.

FIG. 5 and FIG. 6 depict a third embodiment of the first ring. The first ring (third embodiment) is designated by reference numeral 64 and the first ring cross section (third embodiment) is designated by reference numeral 66. The first ring (third embodiment) 64 has a frictional layer 20 with a geometrical configuration which causes the bearing interface to operate in the mixed-film lubrication regime or a partially dry lubrication regime for enhanced internal friction within the axial bearing.

The first wearing layer 12 has a first wearing layer depth 18 ranging from fifty percent to one hundred percent of the wear limit. The frictional layer 20 is positioned adjacent to the first wearing layer 12. The frictional layer 20 includes curved hollow members 34. The curved hollow members 34 are constructed from an elastomer or polymer; preferably from an elastomer. The curved hollow member 34 has a top 38, a bottom 40, and sides 42. In a preferred embodiment, the top 38 is thinner than the bottom 40, or the sides 42 to facilitate the wearing away of the top 38 so that a U-shaped channel or tub-shaped channel remains. The curved hollow member 34 preserves the hollow 44 during assembly or construction of the first ring (third embodiment) 64 by preventing the hollow from filling up with the resin, plastic, or polymer used to make the first wearing layer 12.

The first ring (third embodiment) 64 includes full-film lubrication inhibiting means for inhibiting the axial bearing from operating in the full-film lubrication regime. The full-film lubrication inhibiting means comprises, for example, a channel, a groove, a depression, or the like, in the frictional layer 20. The full-film lubrication inhibiting means has sufficient dimensions to prevent a thin film from coating or adequately lubricating the bearing interface for operation in the full-film lubrication regime.

Once the top 38 wears away, the surface area of the first ring (third embodiment) 64 which is operably associated with the second ring is greatly reduced. Hence, the bearing interface between the first ring (third embodiment) 64 and the second ring is unable to support a sufficient fluid film for operation in the full-film lubrication regime. Instead, operation occurs in the mixed-film lubrication regime or a partially dry lubrication regime so that the frictional coefficient is increased. For example, the frictional coefficient may be increased by twenty times or more from the frictional coefficient of a wetted bearing interface. Moreover, the friction coefficient of elastomers in a dry environment on a hard surface such as a ceramic second ring, theoretically have a frictional coefficient as high as four (4.0). Therefore, FIG. 5 and FIG. 6 illustrate the first ring (third embodiment) 64 in which a variation in a friction coefficient of the axial bearing is accomplished by destruction of the full-film lubrication regime at the bearing interface.

Fourth Embodiment of the First Ring

Figure 8:
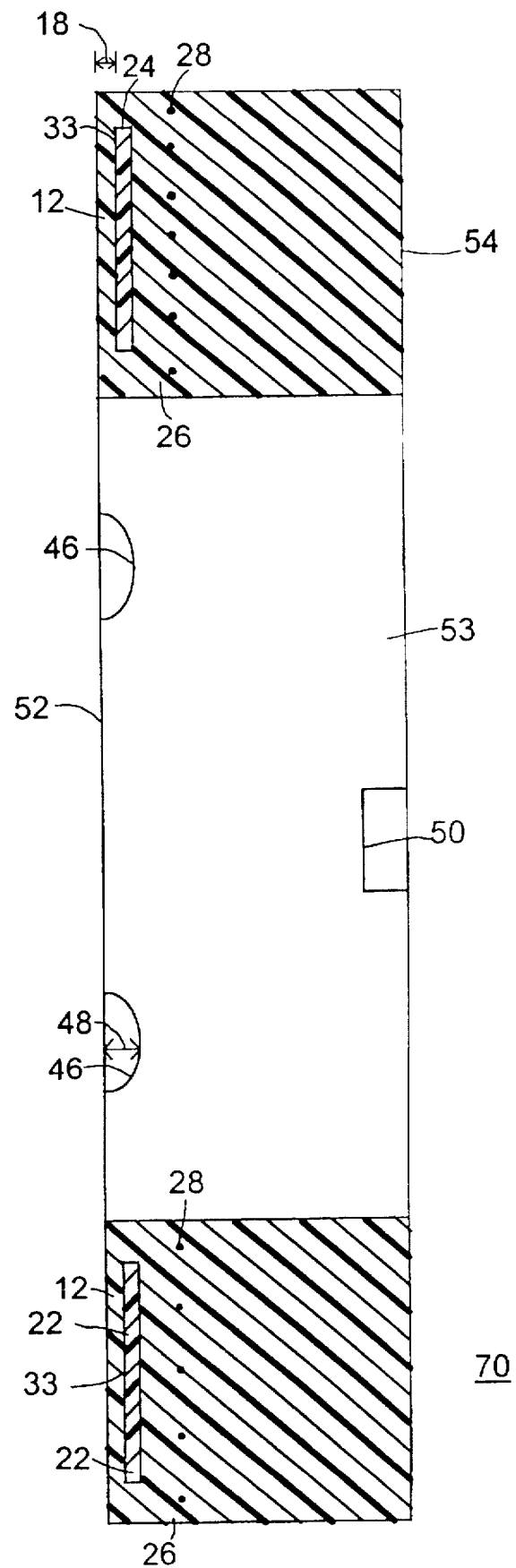
FIG. 8 shows a cross-sectional view of the fourth embodiment of the first ring along reference line 8—8 of FIG. 7, where the circular pad is made from elastomer.

FIG. 7 and FIG. 8 show the fourth embodiment of the first ring, which is designated by reference numeral 68 and the first ring cross section (fourth embodiment) which is designated by reference numeral 70. The first ring (fourth embodiment) 68 has a first wearing layer 12 which has a wearing layer depth 18 ranging from fifty to one hundred percent of the wear limit as illustrated in FIG. 8. The first ring (fourth embodiment) 68 features an annular pad 33 which is preferably made from an elastomer.

The surface area of the annular pad 33 is calculated so that the drive motor is not unduly loaded. The operating torque of the drive motor is proportional to the product of the following factors: (a) the coefficient of friction, (b) the axial force applied to the axial bearing, and (c) a term which is derived from the surface area of the contact surfaces of the axial bearing. Reducing the surface area of the annular pad 33 will lower the value of the term which is derived from the surface area. Therefore, by reducing the surface area of the annular pad 33, the operating torque requirements of the drive motor may be decreased, so that the increased load on the drive motor is not too severe. Moreover, annular pads 33 having different surface areas may be manufactured to correspond to drive motors of various torque capacities.

Fifth Embodiment of the First Ring

Figure 10:
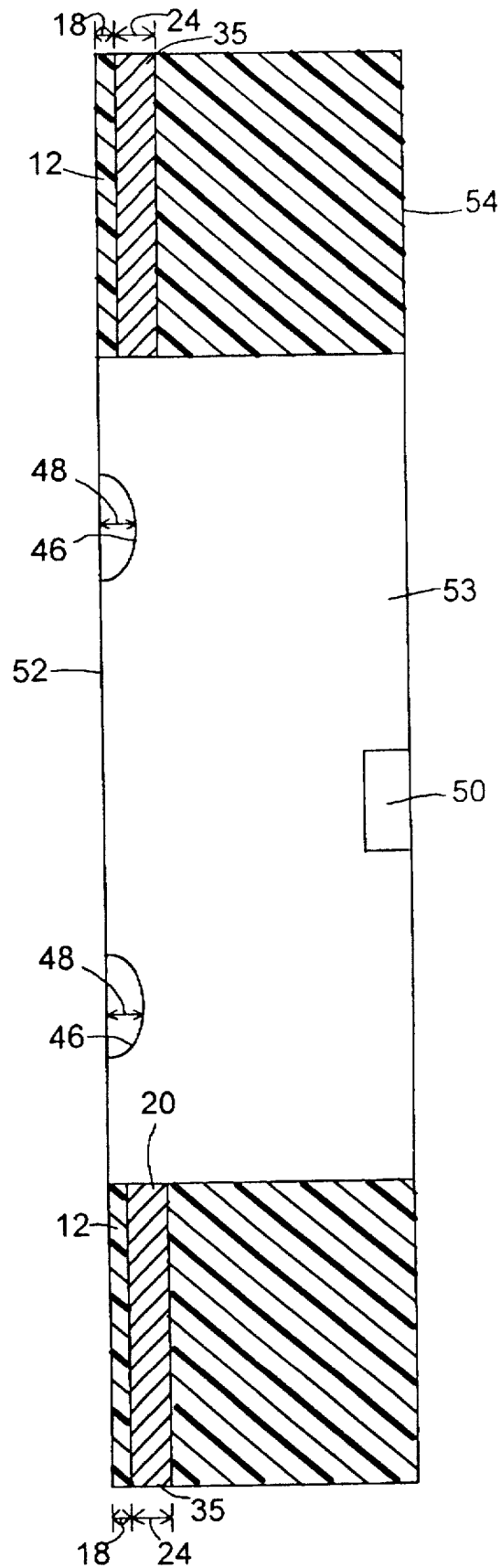
FIG. 10 shows a cross-sectional view of the fifth embodiment of the first ring along reference line 10—10 of FIG. 9, wherein the annular pad is preferably made from a polymer composite, a plastic composite, a particulate composite, or a metal and wherein the annular pad encompasses the entire frictional layer.

FIG. 9 and FIG. 10 show the fifth embodiment of the first ring. The first ring (fifth embodiment) is designated by reference numeral 72 and the first ring cross section (fifth embodiment) is designated by reference numeral 74.

The frictional layer 20 of FIG. 9 is occupied entirely by the frictional region 22. In other words, the first ring (fifth embodiment) 72 has no remanent region. The frictional region 22 is constructed from an elastomer, stainless steel, a ceramic material, a ceramic composite, a plastic composite, a polymer composite, a plastic laminate, a reinforced plastic, a polymer-particulate composite, a plastic-particulate composite, or the like. Plastics, polymers, or elastomers may be selected based on compressive strength, tensile strength, chemical resistance, hardness and ductility. Hardness is a measure of resistance of material to indentation and scratching. Ductility is the ability of a material to deform plastically before breaking. The *Handbook of Plastics, Elastomers, and Composites* lists the properties of plastic resins to assist engineers and scientists in the selection of suitable plastic resins or polymers for particular applications. The chart in Appendix C on pages C1 to C50 of the *Handbook of Plastics, Elastomers, and Composites* by Charles A. Harper, published by McGraw-Hill, Inc. in New York, N.Y. (Second Edition 1992), is hereby incorporated by reference into this specification.

The frictional region 22 is preferably constructed from a plastic laminate, a reinforced plastic, a plastic composite, a polymer composite, a polymer-particulate composite, a plastic-particulate composite, or stainless steel where maximizing the value of the coefficient of friction of the frictional layer 20 is the fundamental design criteria. The frictional region 22 of the first ring (fifth embodiment) 72 has an annular shape and optimally has a maximum diameter which substantially equals the maximum diameter of the first ring (fifth embodiment) 72 so that the surface area of the frictional region 22 is maximized.

Laminates, reinforced plastics, composites, and particulate composites are formed by binding reinforcing material with a polymer binder, a plastic binder, or a resin. Reinforcing materials are typically in fiber form. Reinforcing materials include glass fiber, cotton fiber, linen fiber, nylon fiber, inorganic fiber, organic fiber, acrylic fiber, polyester fiber, polypropylene fiber, polyethylene fiber, metal fiber, nickel fiber, stainless steel fiber, steel fiber, aluminized glass fiber, aramid fiber, boron fiber, carbon fiber, carbon-graphite fiber, ceramic fiber, and mica. Inorganic reinforcing fibers include magnesium oxysulfate, milled glass, phosphate fiber, and processed mineral fiber. Among these nylon, aramid and various organic fibers have the best abrasion resistance. Glass fibers are among the most commercially prevalent fibers. C glass fibers have optimum chemical resistance, while S glass fibers have good strength and stiffness.

The reinforcing material need not be in fiber form. For example, particulate composites may be used. Particulate composites signify discrete particles of a reinforcing material that are surrounded by a matrix of binding resin. Particulate composites have isotropic mechanical properties, or properties which are uniform in all directions. In contrast, fibers impart structural properties depending upon their orientation within the matrix of binding resin.

Polymer particulate composites may use ceramic particles or metal particles as the reinforcing material. For example, nickel, boron carbide, silicon carbide, silicon nitride, silica, alumina, alumina silica, alumina boria silica, cubic boron nitride, stainless steel, silicon carbide filaments, steel fiber, or boron-tungsten fibers may be used as the reinforcing material. The advantage of the foregoing ceramic materials and metal materials is that these materials consistently produce an ample contrast in coefficient of friction with a ceramic second ring for detectable changes in the load upon the drive motor.

Resins include fluorocarbon plastics, polytetrafluoroethylene (PTFE), phenolic resin, melamien polymer, epoxy, polyester, silicone, polypropylene, polycarbonate, polyethylene, bisamaleimide, polyimide, thermosetting polymers, and thermoplastic materials. Epoxy has excellent adhesion, tensile strength, and compressive strength. In the first ring (fifth embodiment) 72 the laminating resin is optimally polytetrafluoroethylene (PTFE) or epoxy and the reinforcing material is preferably a metal, an alloy, or a ceramic compound.

Manufacturing the First Ring of the Axial Bearing

Numerous methods are available for manufacturing the first ring. Molding, injection molding, extrusion, sheet molding, and filament winding are manufacturing methods which are well known in the art. In a preferred manufacturing method, the first step is to make the frictional region if the frictional region is being constructed from an elastomer, a polymer composite, a plastic composite, a polymer particulate, or a plastic particulate. For example, the cylindrical pads are preferably made by extrusion through circular die, which produces a cylindrical rod. The cylindrical pads are cut from the cylindrical rod to the desired thickness of the frictional region. Similarly, the annular pads may be made by extrusion through an annular die, which produces a hollow cylindrical rod. The annular pads are cut from the hollow cylindrical rod to the desired thickness. The curved hollow members may also be constructed via an extrusion process.

Second, resin granules or resin powder used to construct the first wearing layer is carefully measured and placed in a female mold of the first ring. Third, the finished frictional region may then be added to the resin granules or resin powder placed in the female mold. Fourth, additional resin granules or resin powder is added to top off the mold. Fifth, the contents of the mold may be heated and compressed appropriately depending upon whether the process involves a thermoplastic resin or thermoset plastic resin. Thermoset plastic resins may require the addition of a catalyst or ultraviolet light to properly cure as is well known to one of ordinary skill in the art.

The first ring can also be constructed by layering sheets of thermoplastic material of the desired thickness and orientation for the desired first wearing layer depth, the frictional layer thickness, and the second wearing layer depth. The sheets are placed over the edges of a female mold cavity while heat is applied. The process is expedited by applying pressure to the top, such as air pressure and gravity pressure, and applying a vacuum to the female mold cavity.

Other plastic forming techniques such as filament winding can be used to create layers with distinct frictional properties by deliberately increasing the fiber density in certain areas of the helical winding process. Helical winding involves wrapping resin-impregnated fibers around a mandrel to form a cylindrical structure, like the first ring.

Axial Bearing Incorporated into a Centrifugal Magnetic-Drive Pump

Figure 11:
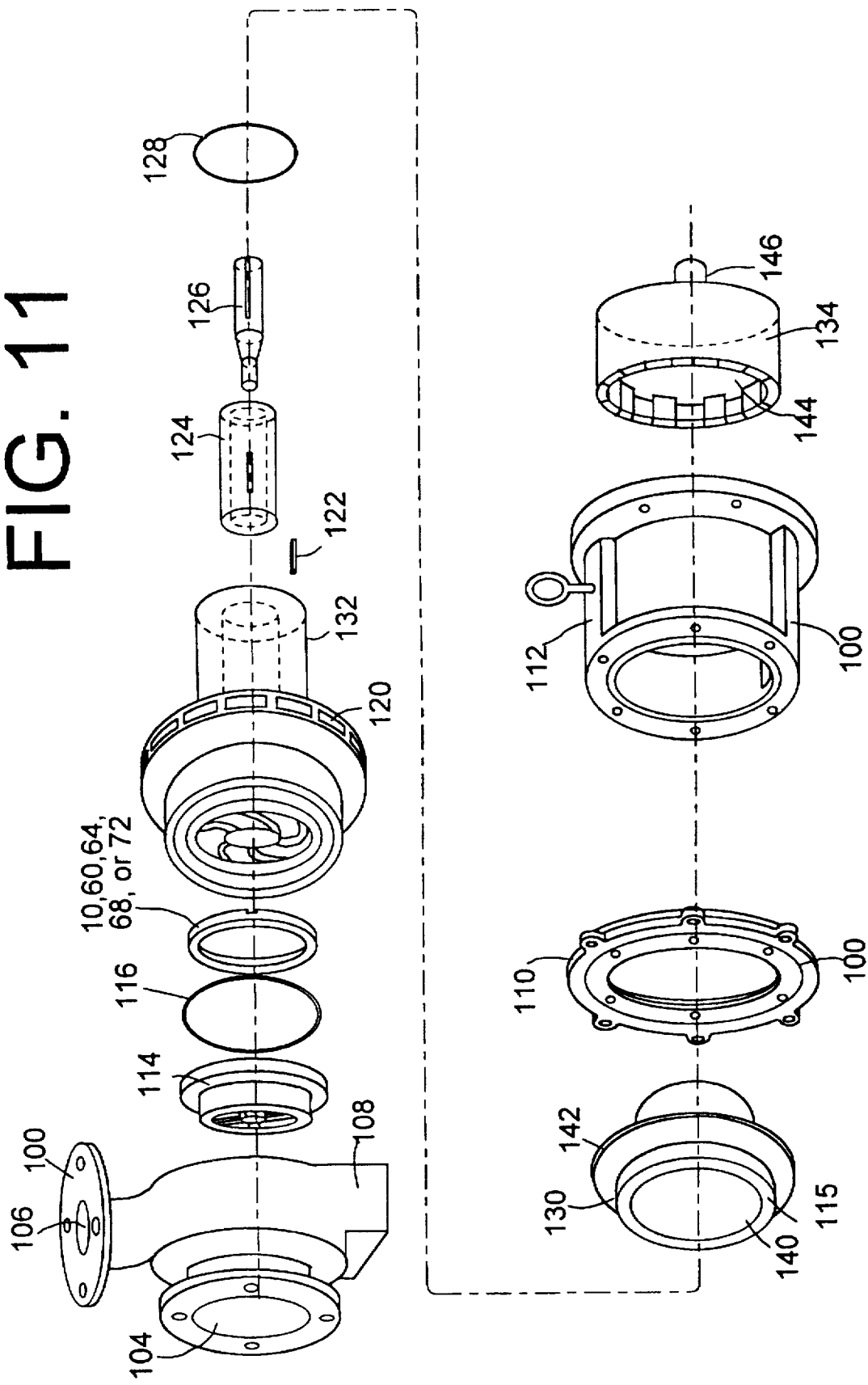
FIG. 11 shows a perspective exploded view a magnetic-drive centrifugal pump incorporating the axial bearing.
Figure 12:
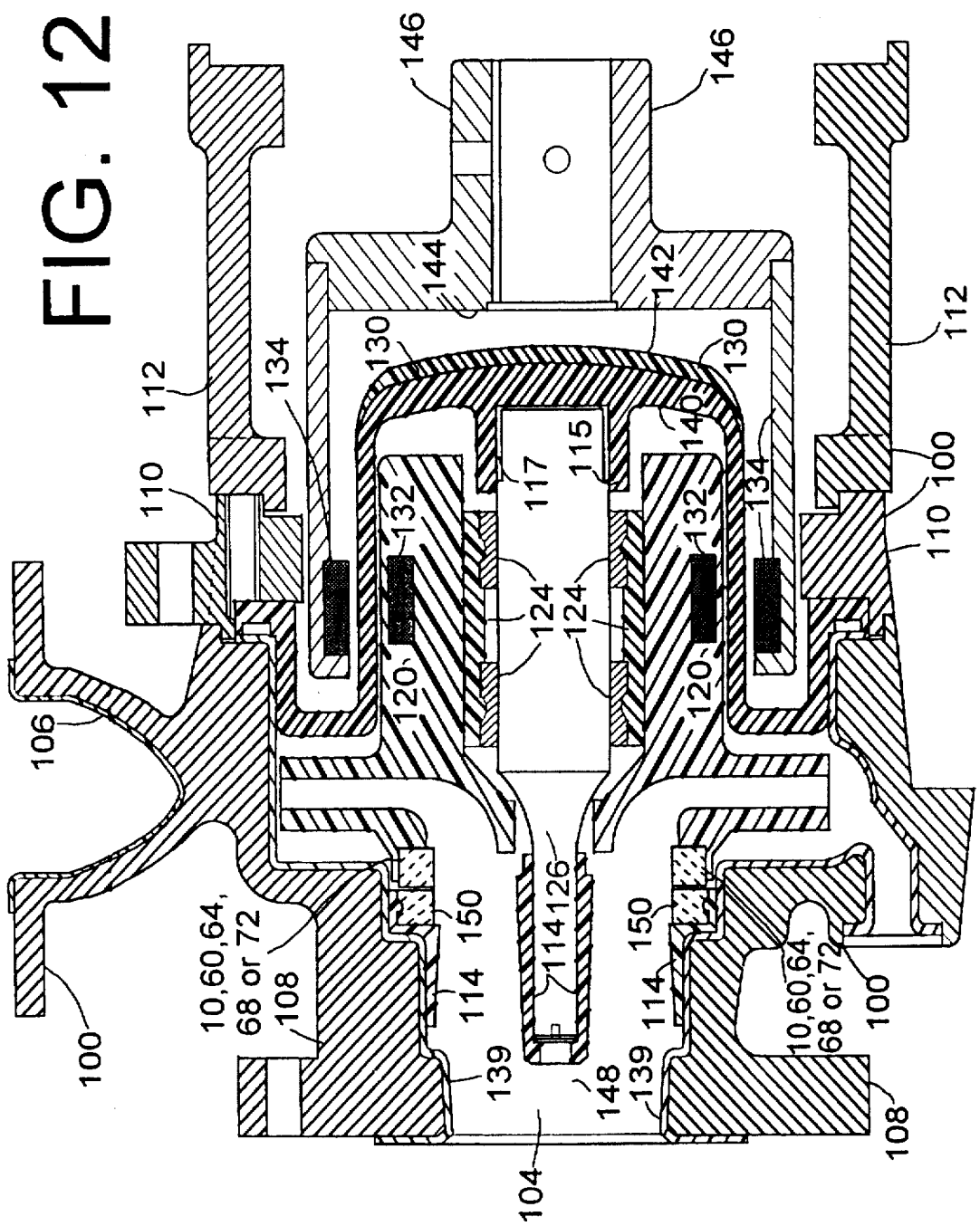
FIG. 12 shows a cross-sectional view of the magnetic-drive centrifugal pump depicted in FIG. 11.

Referring to FIG. 11, FIG. 12, and FIG. 13, the centrifugal pump of the present invention comprises a housing 100, a first ring, a second ring 150, a shaft 126, a first shaft support 114, a second shaft support 115, a bearing 124, an impeller 120, a first coupler 132, a second coupler 134, and a containment shell 130.

The housing 100 preferably has a first housing member 108, a second housing member 110, and a third housing member 112. The first housing member 108 and the second housing member 110 mate with a second gasket 128 (i.e. an O-ring). The containment shell 130 adjoins the first housing member 108 and the second housing member 110. The second housing member 110 is secured to the first housing member 108. The third housing member 112 is secured to the first housing member 108 or the second housing member 110, or both the first housing member 108 and the second housing member 110.

The housing 100 has an inlet 104 to receive a fluid and an outlet 106 to emit the pumped fluid. The housing 100 has an inlet flange and an outlet flange for the attachment of external plumbing to the pump. The inlet flange and outlet flange have a plurality of holes to facilitate the attachment of external plumbing. The housing 100 may be constructed from cast iron, ductile iron, stainless steel, alloys, or other metals. The interior fluid-contacting surfaces of the housing 100 are preferably coated with a corrosion-resistant lining 139.

The shaft 126 is disposed in the housing 100 and is preferably secured to the housing 100. The shaft 126 is secured to the housing 100 by a support assembly that preferably includes a first shaft support 114 and a second shaft support 115. For instance, the first shaft support 114 may be located near the impeller 120 and the second shaft support 115 may be located adjacent to or integral with the containment shell 130.

The first shaft support 114 and the second shaft support 115 each have a socket, a recess, or an opening which corresponds to and complementally mates with the grooved shaft 126. For example, the first shaft support 114 has an opening 136 that engages the shaft 126. Likewise, the second shaft support 115 may include a socket 117 to mate with the flat mating surface 152 of the shaft 126. The shaft 126 may be secured by press fitting the flat mating surface 152 of the shaft 126 into the socket 117. The engagement of the shaft 126 with the socket 117 prevents the undesired rotation of the shaft 126. The second shaft support 115 may be integrated with the containment shell 130 or may be integrated with the second housing member 110. The first shaft support 114 and the second shaft support 115 are preferably constructed of plastic resin with carbon fiber reinforcement.

FIG. 13 shows only the portion of the pump interior in the region of the first ring and the second ring 150. Any of the foregoing embodiments of the first ring may be incorporated into the pump including the first ring 10, 60, 64, 68, or 72. The first ring has a first face 52 and a second face 54. The second ring 150 has a first side 51 and a second side 55. The first face 52 is directed toward the first side 51. The first face 52 and the first side 51 form a bearing interface 156 between the first ring and the second ring 150. The bearing interface 156 may be lubricated, but need not be lubricated, by pumped fluid which is circulated in the interior of the housing 100. Pressure is usually placed on the bearing interface 156 by the internal circulation of the pumped fluid. The bearing interface 156 is suitable for rotational movement of the first ring with respect to the second ring 150.

The first ring has notches 50 on its second face 54. The notches 50 cooperatively engage retaining protrusions 148, which are affixed to the impeller 120. The first ring is preferably press-fitted or snap-fitted into the impeller 120. Hence, the first ring and the impeller 120 are coupled together and rotate simultaneously.

The second ring 150 is preferably press-fitted into the first shaft support 114. The second ring 150 is preferably constructed from a ceramic material such as silicon carbide. The first shaft support 114 has a cylindrical recess (not shown) adapted to receive the second ring 150. The second ring 150 may have nibs about its periphery to prevent rotation relative to the first shaft support 114. The first shaft support 114 engages the housing 100. The first ring rotates with respect to the second ring 150 when the pump operates.

The bearing 124 is attached to the impeller 120. A key 122 fits in a slot 240 located in the bearing 124 and the impeller 120 to prevent the impeller 120 from rotating with respect to the bearing 124. In a preferred embodiment, the impeller 120 is constructed from a carbon filled plastic resin, such as a mixture of polyacrylonitrile (PAN) carbon fiber and ethylene-tetra-fluoro-ethlene (ETFE).

The impeller 120 has a cylindrical portion which optimally encapsulates the first coupler 132. The first coupler 132 comprises a magnet, a rare-earth magnet, a plurality of magnets, or a torque ring. A torque ring is typically constructed from a metal such as steel, copper, an alloy, or the like. As illustrated the impeller 120 is a fully closed impeller, in which the vanes are concealed by a back shroud and a front cover. In practice, the impeller 120 may be partially open impeller, or a fully open impeller depending upon the characteristics of the fluid to be pumped. The first coupler 132 is enclosed by the containment shell 130 and the housing 100. The first coupler 132 is located on a wet side 140 of the containment shell 130.

The second coupler 134 is located in proximity to the first coupler 132 on a dry side 142 of the containment shell 130. The second coupler 134 has a cylindrical cavity 144 which is coaxially oriented with respect to the containment shell 130. The second coupler 134 comprises a magnet, a rare-earth magnet, a plurality of magnets, an electromagnet, a plurality of electromagnets, or a torque ring. The second coupler 134 is coupled to a drive motor (not shown).

The containment shell 130 is secured to the housing 100. The containment shell 130 is preferably constructed from a nonconductive material, such as ethylenetetra-fluoro-ethlene (ETFE), or a fiber fabric vinyl ester composite. The containment shell 130 may also be made from stainless steel, nickel, cadmium, a metal, an alloy, or the like. The containment shell 130 confines the pumped fluid to the wet side 140 of the containment shell 130.

Axial Bearing Incorporated into a Centrifugal Pump

Figure 14:
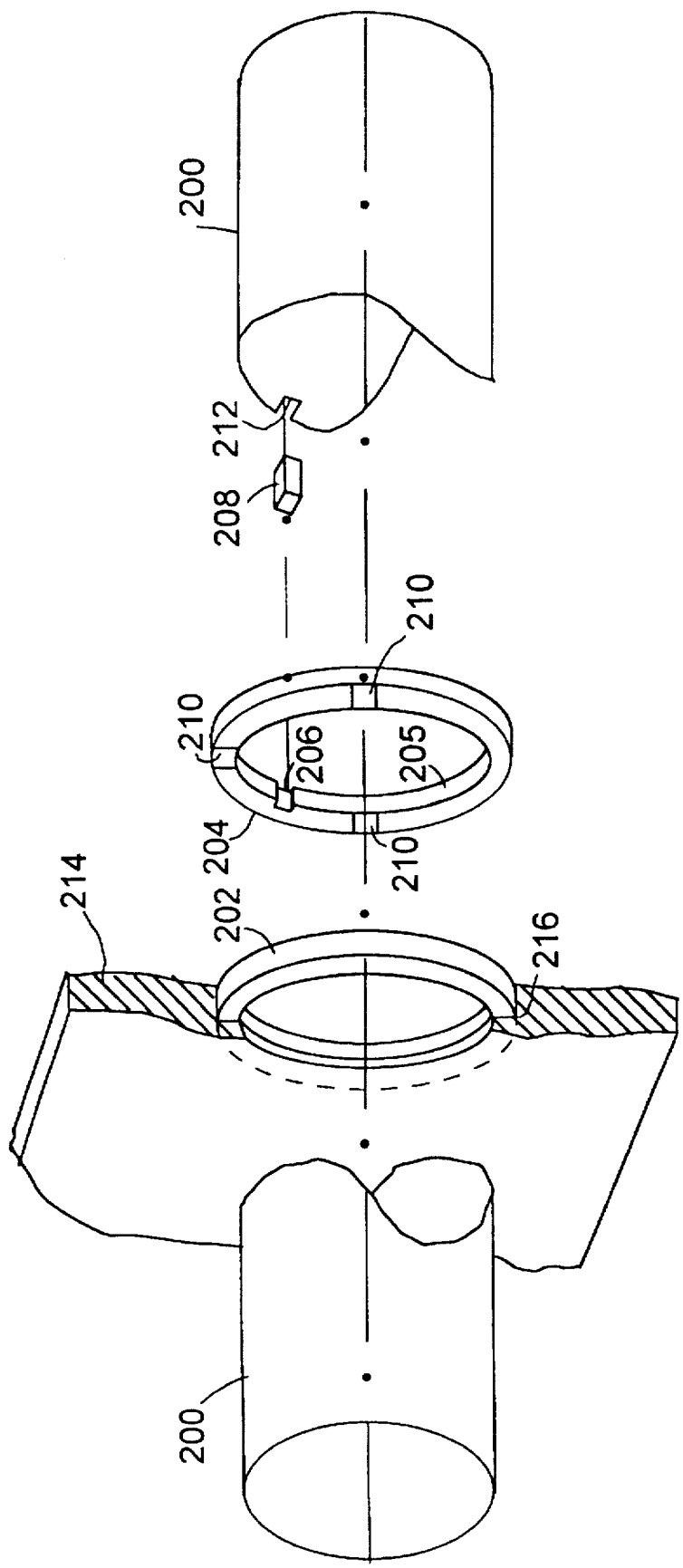
FIG. 14 shows an alternate embodiment of a perspective exploded view of an axial bearing incorporated into a centrifugal pump with only a portion of the pump interior depicted.

FIG. 14 shows an exploded view of the axial bearing incorporated in the interior portion of a centrifugal pump. The axial bearing has a first ring 204 and a second ring 202. The first ring 204 is analogous to the previous embodiments of the first ring except the first ring 204 has a notch 206 located in the cylindrical surface 205. The first ring 204 is coupled to the pump shaft 200 by a key 208 which engages a slot 212 in the pump shaft 200 and the notch 206. Hence, the first ring 204 rotates synchronously with the pump shaft 200. The first ring 204 has radial grooves 210 to provide lubrication at the interface between the first ring 204 and the second ring 202. The pump shaft 200 may have a collar or a step to restrict axial movement of the first ring 204. In practice, other components in the centrifugal pump, such as the impeller may restrict axial movement of the first ring 204, rendering such a collar or a step superfluous.

The second ring 202 mates with an annular recess 216 located in a support 214. The second ring 202 may have nibs (not shown) about its periphery to prevent rotation of the second ring 202. The second ring 202 is substantially stationary with respect to the support 214. The second ring 202 is preferably constructed from a ceramic material.

System For Monitoring the Wear of the Axial Bearing

FIG. 15 through FIG. 19 show various systems for monitoring the wear of the axial bearing described in the foregoing portion of this specification. Each system for monitoring the wear of the axial bearing uses some form of load detection means for detecting the changes in a load placed upon the drive motor. The load detection means may comprise, for example, an energy monitor, a current monitor, a power monitor, a thermal monitor, a revolution per unit time monitor, a torque monitor, or the like. The system for monitoring the wear comprises a pump incorporating the axial bearing 300, a drive motor 301 and an energy monitor 302. In practice, the system for monitoring the wear is coupled to an energy source 304 and is optionally coupled to an alarm 306.

The pump incorporating the axial bearing 300 comprises a centrifugal pump or a magnetic-drive centrifugal pump which incorporates any embodiment of the first ring described in the foregoing specification. The pump incorporating the axial bearing 300 is coupled to the drive motor 301. For example, the pump incorporating the axial bearing 300 may be close-coupled to the drive motor 301. The drive motor 301 is typically a three-phase alternating current electrical motor. However, the drive motor 301 may also comprise a single-phase alternating current motor, a dual-phase alternating current motor, or a direct current electrical motor.

Figure 15:
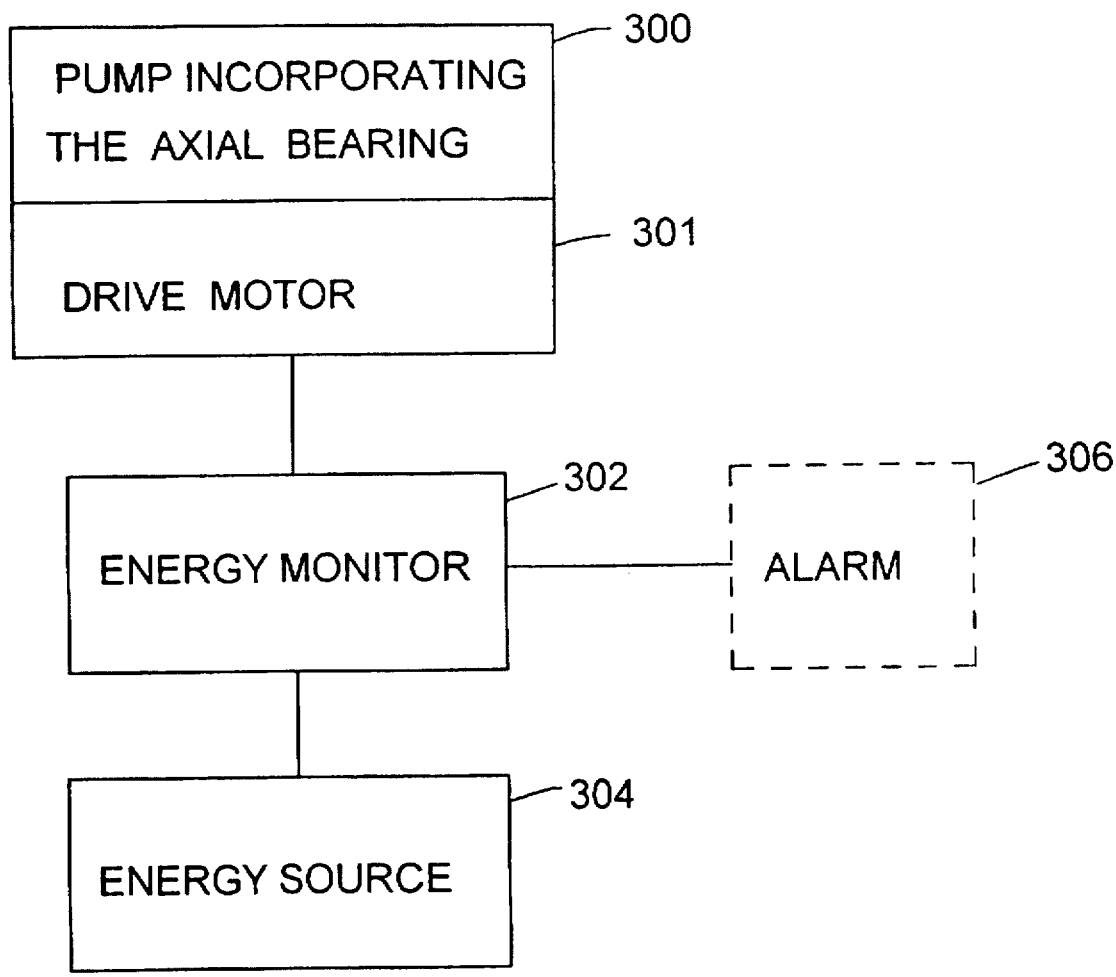
FIG. 15 is a block diagram of the system for monitoring the wear of the axial bearing having a variable coefficient of friction where the axial bearing is installed in a centrifugal pump.

Referring to FIG. 15, the energy monitor 302 comprises a current monitor, a power monitor, a power monitor for three-phase circuits, a monitor of the phase of current and phase voltage (i.e. a power factor monitor), a three phase solid-state overload relay, an instantaneous trip current relay, a magnetic overload relay, an ammeter, a fuse, or the like. The monitor 302 is electromagnetically or electrically coupled between the energy source 304 and the drive motor 301. Power monitors are commercially available from numerous sources. For instance, Ansimag, Inc., located at 1090 Pratt Blvd. in Elk Grove Village, Ill., presently offers the Dry-Kut® DKW2 Power Monitor and the Dry-Kut® DKA Amperage Monitor. Energy monitors are also available from Load Controls Inc., Technology Park, 10 Picker Rd., Sturbridge, Mass. 01566.

The power monitor for three-phase circuits measures the current in one of the three power phases electromagnetically via a toroidal ferrite and coil. Meanwhile, the power monitor measures voltage across the two remaining phases. If the current and the voltage in each of the three-phase lines are in phase, then the power factor is at a maximum; hence, the load is at a maximum. At or near full loading the drive motor primarily acts as a resistive electrical load, which causes the current and voltage in each of the three phases to be in phase. Power in the three-phase system theoretically has a linear relationship over the entire load range from no load to full load. Power monitors typically feature adjustable full load trip point. Many power monitors are equipped with Form C relays to operate alarms or to automatically remove the power being supplied to the drive motor.

The energy monitor 302 may also comprise a three-phase solid state overload relay which is commercially available from the Furnac Electric Company in Batavia, Illinois. For single-phase drive motors, the energy monitor 302 may comprise an instantaneous trip current relay. The instantaneous trip current relay is connected, or electromagnetically coupled, in series with the drive motor and the energy source 304.

Figure 16:
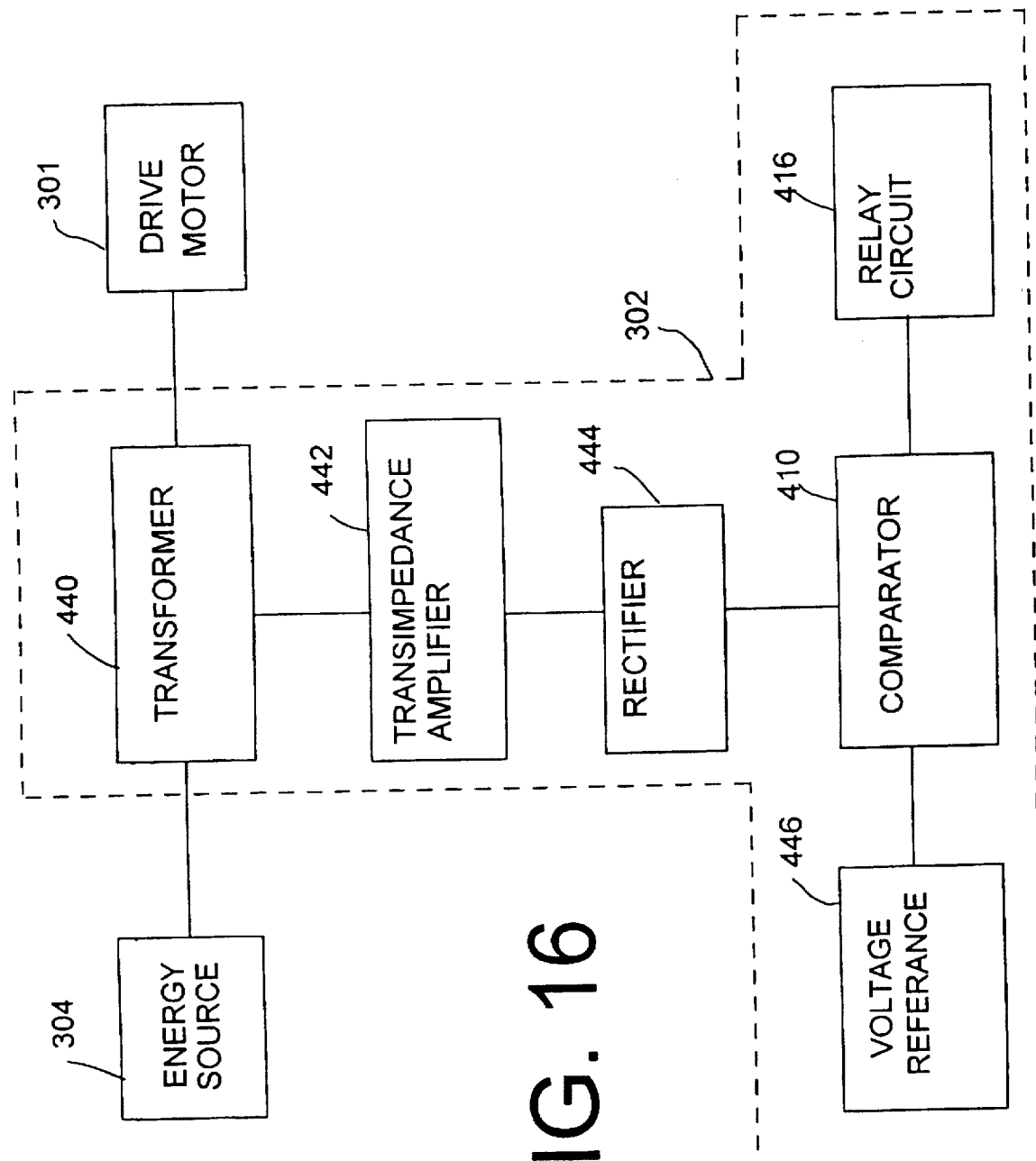
FIG. 16 is a block diagram of a system for monitoring the wear of the axial bearing in which the energy monitor comprises a current monitor.

FIG. 16 is a block diagram of an energy monitor 302, wherein the energy monitor 302 is equipped to measure current. If current drawn by the drive motor 301 exceeds a maximum predetermined level then, in response, the relay circuit 416 is activated for control of an external device, such as an alarm. The energy monitor 302 in FIG. 16 comprises a transformer 440, a transimpedance amplifier 442, a rectifier 444, a comparator 410, a voltage reference 446, and a relay circuit 416.

At least one conductor couples the energy source 304 to the drive motor 301. The transformer 440 is electromagnetically coupled to any current flowing in the conductor. The transformer 440 preferably comprises a toroidal transformer with a ferrite core. The primary of the transformer 440 may be formed by winding the conductor around the ferrite core. The secondary of the transformer 440 is connected to the transimpedance amplifier 442. The transimpedance amplifier 442 accepts a current signal at the input of the transimpedance amplifier 442 and produces an amplified voltage at the output of the transimpedance amplifier 442. The output of the transimpedance amplifier 442 is connected to a rectifier 444, which may comprise, for example, a bridge rectifier. The rectifier 444 changes an alternating current signal to a direct current signal, assuming that the drive motor 301 operates on alternating current.

The comparator 410 preferably accepts direct current from the rectifier 444 at the noninverting input of the comparator 410. The inverting input of the comparator 444 is coupled to the voltage reference 446, which comprises a regulated and adjustable power supply. The voltage reference 446 provides the reference input for the comparator 410. If the direct current from the rectifier 444 exceeds a voltage level provided by the voltage reference 446, then the comparator 410 activates the relay circuit 416. The relay circuit 416 comprises, for example, a relay and a transistor relay driver. The relay circuit 416 is optimally used to switch an alarm or to switch energy flowing to the drive motor 301.

The system for monitoring the wear of the axial bearing operates in the following manner. Initially, the load on the pump is low during normal operation, because the first wearing layer is preferably constructed from a slippery polymer such as polytetrafluoroethylene (PTFE). However, over time the first wearing layer is removed through normal abrasion and the frictional layer is exposed. Once the frictional layer is exposed an additional load is placed on the pump incorporating the axial bearing 300. The additional load corresponds to the maximum load trip level of the energy monitor 302. Hence, the pump operator or user is alerted that the axial bearing needs replacement.

Figure 17:
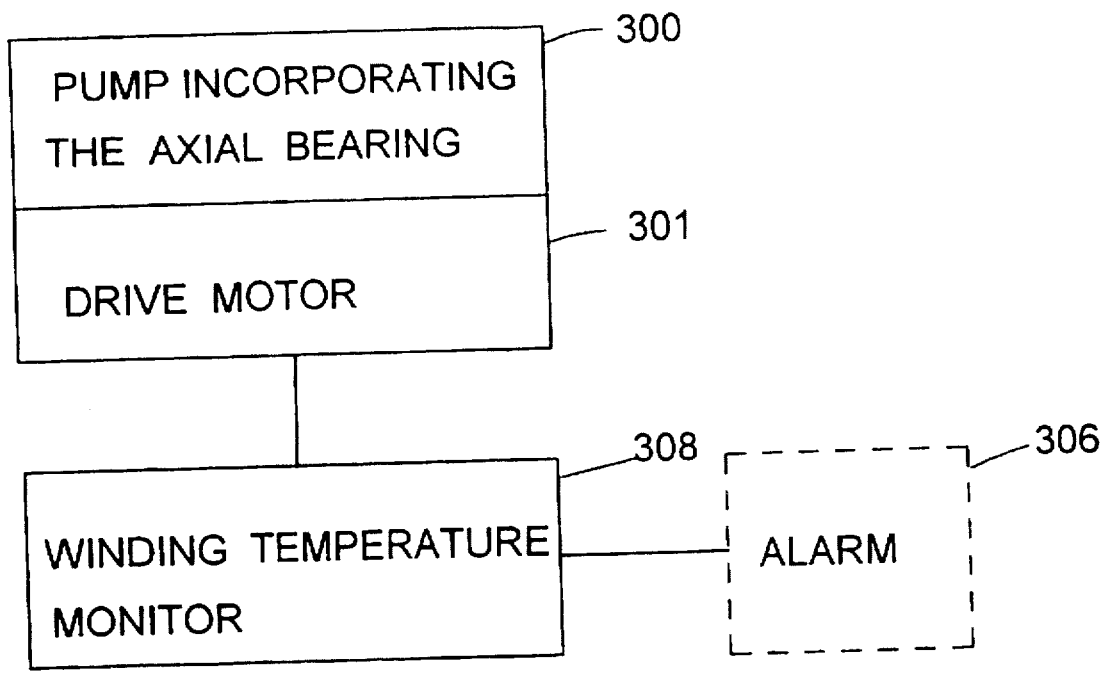
FIG. 17 is a block diagram of a system for monitoring the wear of the axial bearing which features a drive motor equipped with a winding temperature monitor.

FIG. 17 illustrates an alternative to monitoring the load on the drive motor via the energy monitor 302 of FIG. 15. FIG. 17 shows a block diagram of a system for monitoring the load on the drive motor featuring a winding temperature monitor 308. The drive motor 301 includes windings which inherently change in temperature depending upon the load placed on the drive motor 301. The winding temperature monitor 308 has a sensor such as a thermistor, a temperature sensing circuit, a temperature sensing integrated circuit, a bimetallic sensor, a thermal overload relay, a melting alloy thermal relay, a bimetallic overload relay, or the like, which is placed in proximity to the windings or which is placed in thermal communication with the windings via a thermal conduit. When a threshold temperature of the windings is exceeded, the user is alerted via optional alarm 306, which is coupled to the winding temperature monitor 308.

Figure 18:
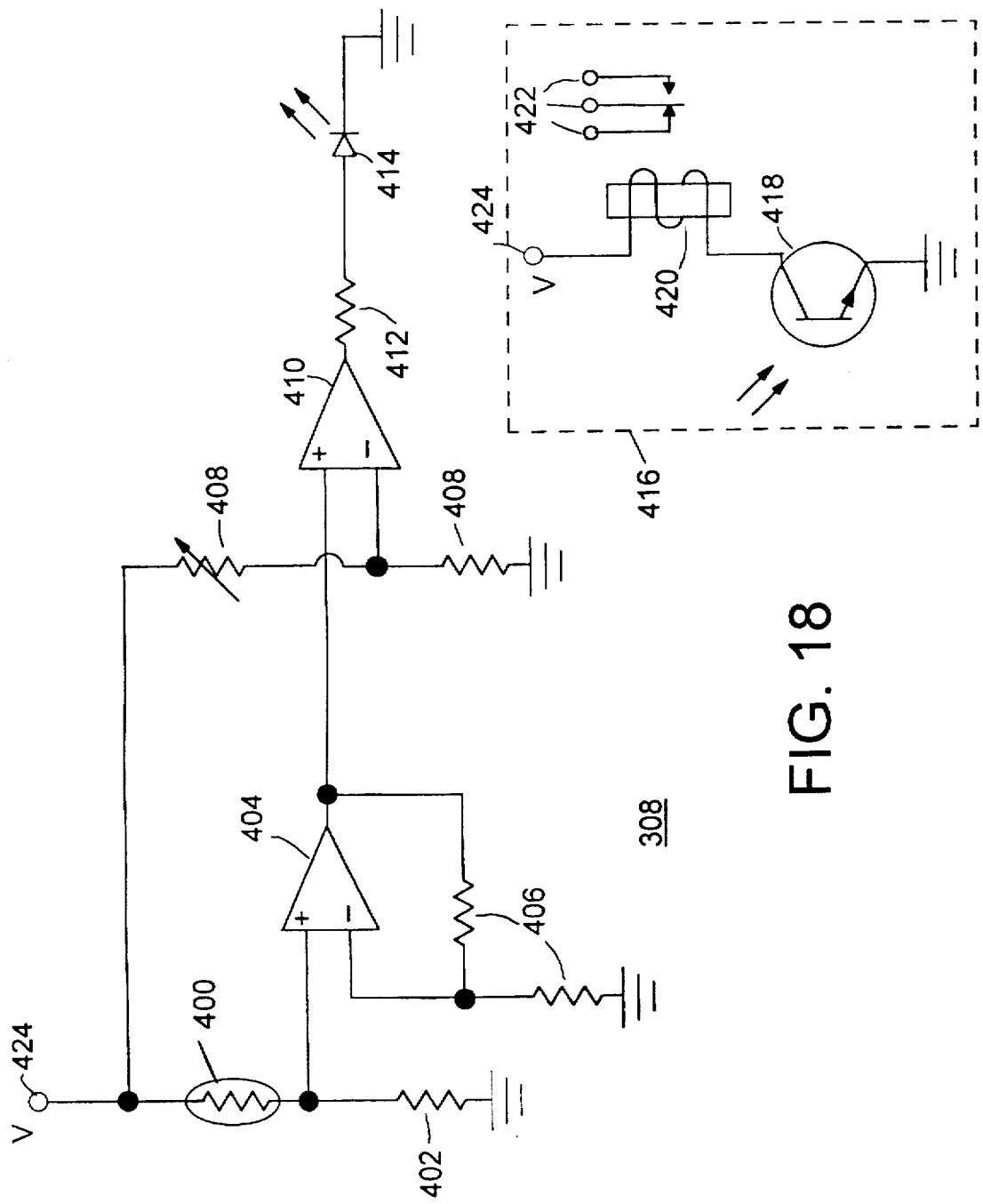
FIG. 18 is a schematic of a first embodiment of the winding temperature monitor illustrated in the block diagram of FIG. 17.

FIG. 18 is a schematic for implementing the winding temperature monitor 308 shown in the block diagram of FIG. 17. The winding temperature monitor 308 comprises a thermistor 400, an operational amplifier 404, a comparator 410. In addition, the winding temperature monitor 308 optionally includes a relay circuit 416. The thermistor 400 may include a pair of balanced thermistors combined in a resistive network to obtain a linear resistive response with temperature variation. Pairs of balanced thermistors are commercially available through suppliers, such as Yellow Springs Instrument Company. The thermistor 400 is coupled to the noninverting input of operational amplifier 404 and resistor 402. The inverting input of the operational amplifier 404 is coupled to the gain setting resistors 406. The output of the operational amplifier 404 is coupled to the noninverting input of a comparator 410. The inverting input of the comparator 410 is coupled to a reference voltage which is provided via the adjustable voltage divider 408. The output of the comparator is coupled to a current limiting resistor and a light emitting diode 414. The light emitting diode 414 may be placed in view for the user or the pump operator as a warning indicator.

Alternatively, the light emitting diode 414 is placed in electromagnetic communication with the relay circuit 416. The relay circuit 416 is an optional addition to the winding temperature monitor 308. The relay circuit 416 comprises a relay 420 which has its solenoid coupled to a photodetector 418. The relay 420 may comprise a solid-state switch in lieu of a conventional electromechanical relay. The photodetector 418 is preferably activated by the light emitting diode 414, which in turn manipulates the contacts 422 for control of an external circuit such as an alarm or a pump control.

When the temperature of the thermistor increases because of increased load on the pump from the frictional layer of the first ring being exposed to the second ring, the resistance of the thermistor 400 declines. The resistance of thermistor 400 is converted to a voltage by the combination of the thermistor 400 and the resistor 402. The voltage is applied to the operational amplifier 404 at the noninverting input and amplified as determined by the gain setting resistors 406. The output of the operational amplifier 404 is fed into the comparator 410, which produces a high output level when the output of the operational amplifier 404 exceeds the reference voltage level at the inverting input of the comparator 410. The high level output from the comparator 410 energizes the light emitting diode 414 to warn a user or to activate the relay circuit 416.

Figure 19:
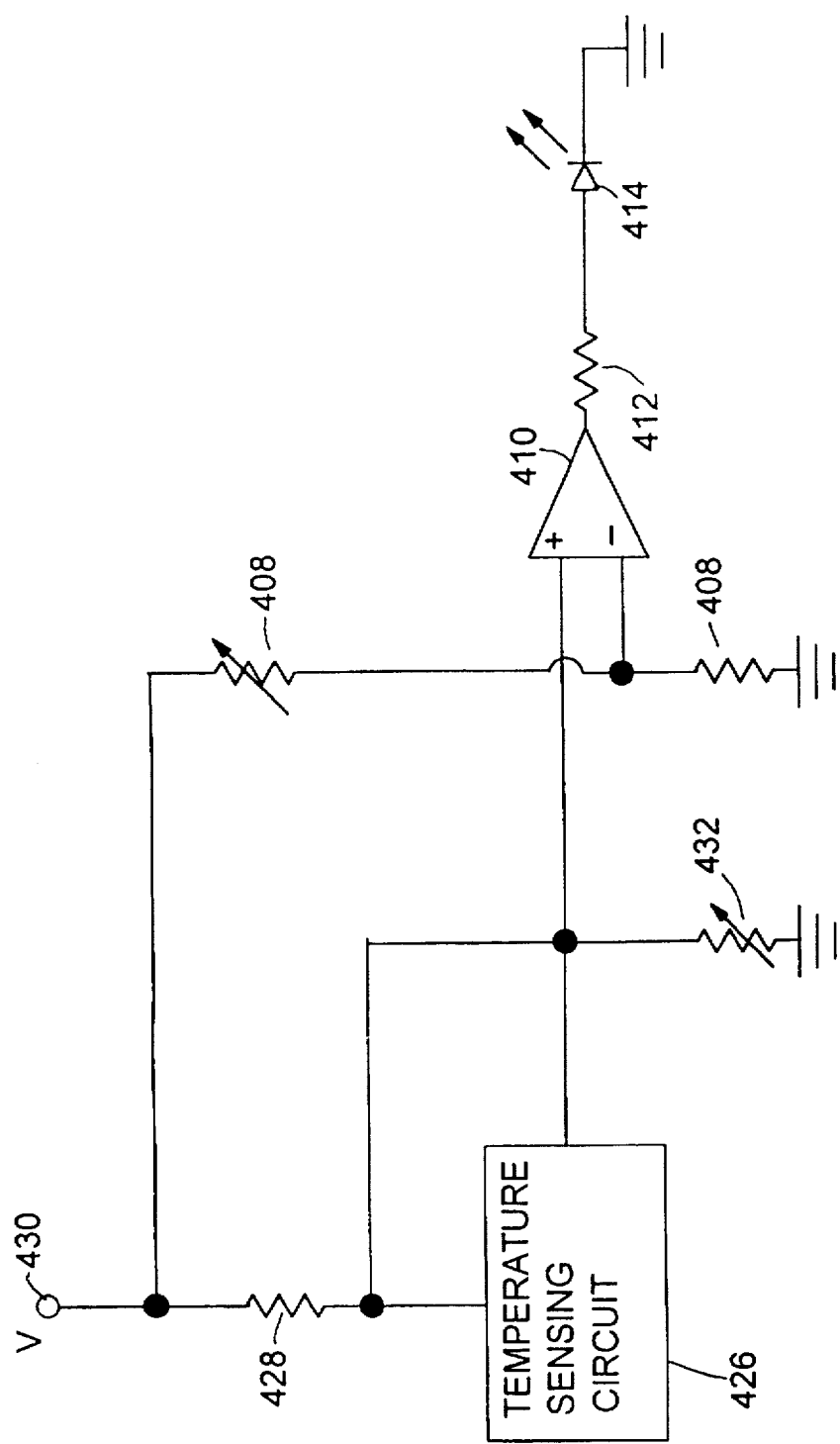
FIG. 19 is a schematic of a second embodiment of the winding temperature monitor illustrated in the block diagram of FIG. 17.

FIG. 19 illustrates an alternative embodiment of the winding temperature monitor 308. The winding temperature monitor 308 includes a temperature sensing circuit 426 which is coupled to a comparator 410 in a threshold non-inverting comparator configuration. The temperature sensing circuit 426 preferably comprises an integrated circuit which produces linear changes in voltage output corresponding to temperature changes. For example, an LM335 or LM335A may be used for the temperature circuit 426. Other temperature sensing circuits 426 may produce linear changes in current corresponding to temperature changes. These temperature sensing circuits may be used in conjunction with a transimpedance amplifier (current to voltage amplifier) and otherwise according to the schematic of FIG. 19.

The supply terminal 430 provides energy to the temperature sensing circuit via a current limiting resistor 428. The output of the temperature sensing circuit 426 is an output voltage which increases with temperature. The output voltage may be adjusted by adjustable resistor 432. The output voltage is coupled to the comparator 410. If the output voltage exceeds the reference voltage applied to the inverting input of the comparator 410 than the output level of the comparator 410 becomes a high output level. Hence, the light emitting diode 414 is illuminated as an indicator to a user or a pump operator that the axial bearing needs to be replaced. In alternative embodiments, the light emitting diode 414 may be replaced by a transistor driver which drives a relay (i.e. switch) to operate an alarm, to control the pump, or to activate some external device. In an alternative embodiment, an inverting comparator configuration may be used rather than the noninverting comparator configuration described above.

Method For Monitoring the Wear of The Axial Bearing

Figure 20:
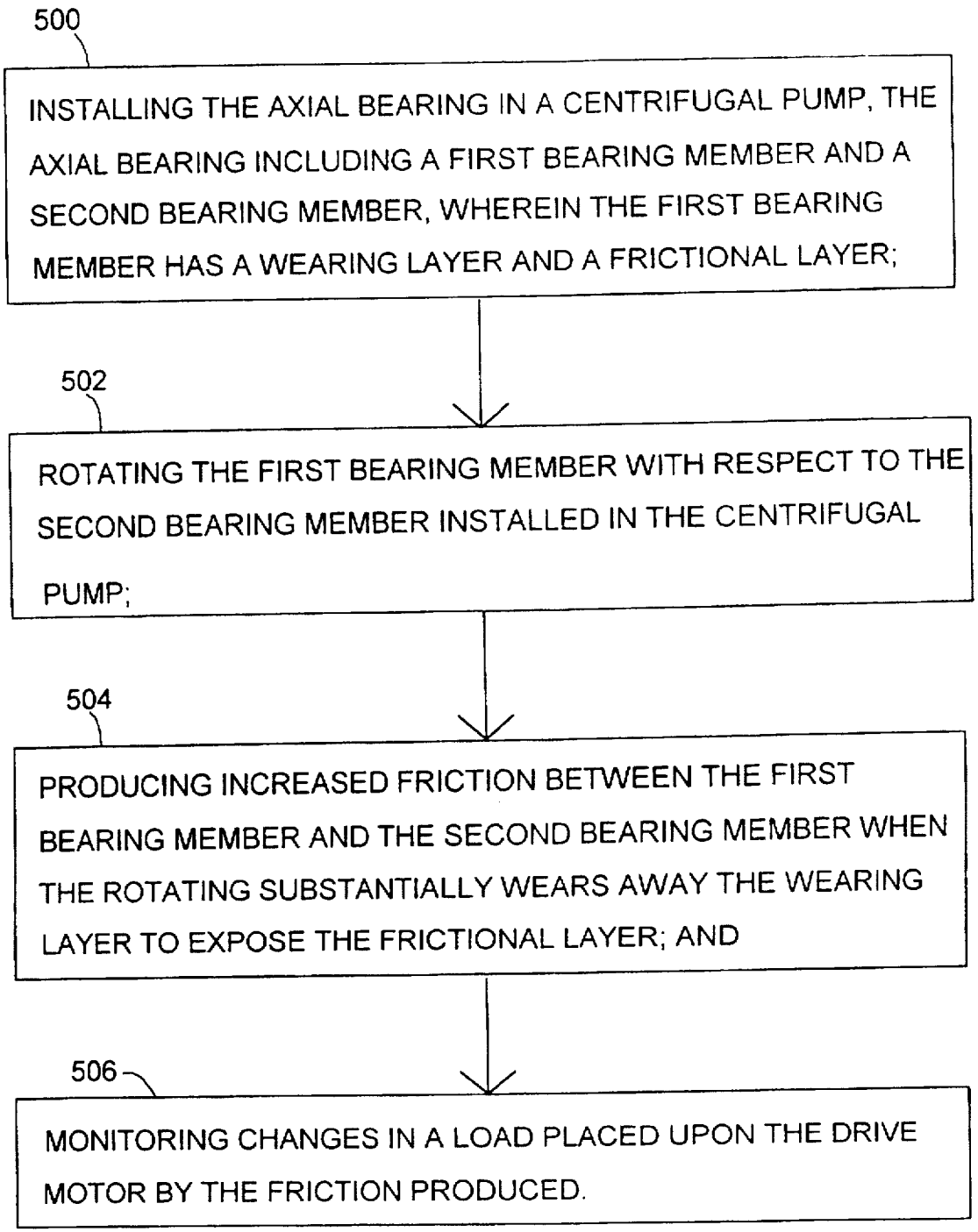
FIG. 20 is a flow chart illustrating the steps in a method of monitoring the wear of the axial bearing wherein the axial bearing is installed in a centrifugal pump.

FIG. 20 illustrates the method for monitoring the wear of the axial bearing having a variable coefficient of friction. In block 500, the axial bearing, having a variable coefficient of friction, is installed in a centrifugal pump. The axial bearing optimally includes a first bearing member (i.e. first ring) and a second bearing member (i.e. second ring.) The first bearing member and the second bearing member each have an annular shape, a disk shape, a parabolic shape, a concave circular shape, a convex circular shape, a semi-spherical shape, a conical shape, or the like. The first bearing member preferably has first wearing layer and a frictional layer, analogous or identical to any of the five embodiments of the first ring previously described in this specification.

In block 502, the first bearing member is rotated with respect to the second bearing member, or the second bearing member is rotated with respect to the first bearing member. Rotation is typically effected by normal operation of the centrifugal pump, in which the axial bearing was previously installed in block 500.

In block 504, increased friction is produced between the first bearing member and the second bearing member when, and after, the rotating in block 502 substantially wears away the first wearing layer to expose the frictional layer. The increased friction may be produced by the interaction of the surface irregularities, surface disparities, localized deformation, or friction welding of the first ring and the second ring. In addition, the increased friction in block 504 may be produced by creating at least one channel in the frictional layer to prevent the first bearing member and the second bearing member from engaging each other in the full-film lubrication regime.

In block 506, changes in the load placed upon the drive motor of the centrifugal pump are monitored or detected in response to the increased friction in block 504. The load on the drive motor may be monitored in by a prodigious variety of methods. For example, monitoring changes in the load may be accomplished by monitoring the changes in the heat dissipated by the drive motor. Monitoring changes in the load placed upon the drive motor may be accomplished by monitoring the changes in the current drawn by the drive motor.

Similarly, monitoring changes in the load placed upon the drive motor may be accomplished by monitoring the changes in the power being supplied by an energy source to the drive motor. Specifically, if the drive motor is an alternating current motor, the phase of the current with respect to the phase of the voltage in any one line, or the load power factor, may be measured. The load power factor is a cosine function based upon the reactance (i.e. resistance) of the drive motor. When the drive motor is under low loads the load power factor is typically inductive; the load power factor approaches zero. In contrast, at high loads the load power factor is primarily resistive; the load power factor approaches one.

If a sufficient predetermined change in the load is detected during the monitoring step of block 506, then an alarm may optionally be activated to alert the user that the axial bearing needs replacement or inspection. A sufficient predetermined change in the load may comprise, for example, a sufficient predetermined change in electrical energy required by the drive motor. Alternatively, if a sufficient predetermined change in the load is detected during the monitoring step of block 506, then the drive motor may be deactivated. Deactivation of the drive motor is preferably accomplished by switching the electrical connection between the energy source and the drive motor.

The foregoing detailed description is provided in sufficient detail to enable one of ordinary skill in the art to make and use the axial bearing, the system for monitoring the wear of the axial bearing, and the method for monitoring the wear of the axial bearing. The foregoing detailed description is merely illustrative of several physical embodiments of the axial bearing and system for monitoring the wear of the axial bearing. Physical variations of the axial bearing and the method, not fully described in the specification, are encompassed within the purview of the claims. Accordingly, the narrow description of the elements in the specification should be used for general guidance rather than to unduly restrict the broader descriptions of the elements in the following claims.

I claim:

1. A system for monitoring the wear of an axial bearing, the system comprising:

a pump incorporating the axial bearing, the pump having a shaft, the axial bearing having frictional means for changing the coefficient of friction of said axial bearing over its lifetime, said frictional means including a wearing layer covering a frictional layer, the wearing layer eventually being depleted during extended operation of the pump to partially or completely expose the frictional layer;

a drive motor coupled to said shaft; and load detection means for detecting load changes in a load placed upon the drive motor; said load detection means comprising an energy monitor; said energy monitor measuring a first electrical energy consumption of the drive motor if the wearing layer is exposed; said energy monitor measuring a second electrical energy consumption of the drive motor if the frictional layer is exposed; the energy monitor being responsive to a differential increase in the energy consumption of the drive motor from the first electrical energy consumption to the second electrical energy consumption.

2. The system according to claim 1 further comprising:

an energy source coupled to the drive motor, the energy source providing electrical energy for the drive motor; the energy monitor electrically or electromagnetically coupled to the drive motor and the energy source, the energy monitor providing a switch responsive to the second electrical energy consumption if the second electrical energy consumption equals or exceeds a predetermined maximum energy level being supplied to the drive motor by the energy source, the predetermined maximum energy level equaling the first electrical energy consumption plus the differential increase.

3. The system according to claim 2 wherein the switch switches an electrical device selected from the group consisting of an alarm, the drive motor, and the energy source.

4. A system for monitoring the wear of an axial bearing, the system comprising:

a pump incorporating the axial bearing, the pump having a shaft, the axial bearing having frictional means for changing the coefficient of friction of said axial bearing over its lifetime, wherein said frictional means including a wearing layer covering a frictional layer, the wearing layer eventually being depleted during extended operation of the pump to partially or completely expose the frictional layer;

a drive motor coupled to said shaft; and an energy source coupled to the drive motor via at least one conductor, the energy source providing electrical energy for the drive motor;

load detection means for detecting load changes in a load placed upon the drive motor, said load detection means comprising an energy monitor, the energy monitor electrically or electromagnetically coupled to the drive motor and the energy source, the energy monitor providing a switch responsive to a monitored energy level that equals or exceeds a predetermined maximum energy level being supplied to the drive motor by the energy source, the energy monitor including a transformer, a transimpedance amplifier, a rectifier, a comparator, and a relay circuit, a secondary of the transformer electromagnetically coupled to said conductor;

an input of the transimpedance amplifier coupled to said transformer;

an output of the transimpedance amplifier connected to the rectifier;

a measuring input of the comparator coupled to the rectifier, a reference input of the comparator connected to a voltage reference source; and an output of the comparator coupled to the relay circuit.

5. A system for monitoring the wear of an axial bearing, the system comprising:

a pump incorporating the axial bearing, the pump having a shaft, the axial bearing having frictional means for changing the coefficient of friction of said axial bearing over its lifetime, wherein said frictional means including a wearing layer covering a frictional layer, the wearing layer eventually being depleted during extended operation of the pump to partially or completely expose the frictional layer;

a drive motor coupled to said shaft, and load detection means for detecting load changes in a load placed upon the drive motor, the load detection means comprising a winding temperature monitor, the winding temperature monitor coupled in thermal communication to a winding of said drive motor; the winding temperature monitor having a thermistor, an operational amplifier, and a comparator; the thermistor connected to an input of the operational amplifier, an output of the operational amplifier coupled to the comparator, an output of the comparator indicative of a predetermined maximum temperature of the winding.

6. The system according to claim 5 further comprising a light emitting diode coupled to the output of said comparator.

7. The system according to claim 6 wherein the light emitting diode is coupled to a relay circuit having a photodetector; wherein the relay circuit switches a device selected from the group consisting of an alarm, the drive motor, and an energy source.

8. A system for monitoring the wear of an axial bearing, the system comprising:

a pump incorporating the axial bearing, the pump having a shaft the axial bearing having frictional means for changing the coefficient of friction of said axial bearing over its lifetime, wherein said frictional means including a wearing layer covering a frictional layer, the wearing layer eventually being depleted during extended operation of the pump to partially or completely expose the frictional layer;

a drive motor coupled to said shaft; and load detection means for detecting load changes in a load placed upon the drive motor, the load detection means comprising a winding temperature monitor, the winding temperature monitor coupled in thermal communication to a winding of said drive motor; the winding temperature monitor having a temperature sensing circuit connected to a comparator, an output of the comparator indicating an overheating of said winding.

9. A method of monitoring the wear of an axial bearing incorporated into a centrifugal pump being driven by a drive motor, the axial bearing having a first bearing member and a second bearing member, the method comprising the steps of:

a) installing the axial bearing in the centrifugal pump, the first bearing member including a wearing layer disposed on the exterior of the first bearing member and a frictional layer disposed in the interior of the first bearing member;

b) rotating the first bearing member with respect to the second bearing member, subsequent to the installation in the step a, while operating said centrifugal pump;

c) producing increased friction between the first bearing member and the second bearing member when the rotating in the step b substantially wears away the wearing layer to expose the frictional layer;

d) monitoring the changes in a load placed upon the drive motor by the increased friction produced in the step c to determine if the axial bearing requires replacement.

10. The method according to claim 9 wherein the step c, producing the increased friction, is accomplished by creating at least one channel in the frictional surface to prevent the first bearing member and the second bearing member from engaging each other in a full film lubrication regime.

11. The method according to claim 9 wherein the step d, monitoring the changes in the load, is accomplished by monitoring the changes in the heat dissipated by windings of the drive motor.

12. The method according to claim 9 wherein the step d, monitoring the changes in the load, is accomplished by monitoring the changes in the current drawn by the drive motor.

13. The method according to claim 9 wherein the step d, monitoring the changes in the load, is accomplished by monitoring the changes in the power required by an energy source to the drive motor.

14. The method according to claim 9 wherein the step d, monitoring the changes in the load is accomplished by monitoring the changes in a load power factor of an alternating current circuit supplying energy to the drive motor.

15. The method according to claim 9 further comprising the step of:

e) activating an alarm in response to a sufficient, predetermined change in the load on the drive motor being monitored in the step d.

16. The method according to claim 10 further comprising the step of:

e) deactivating the drive motor in response to a sufficient predetermined change in the load placed upon the drive motor being monitored in the step d.

17. The method according to claim 9 wherein the step b, rotating, is accomplished by a three-phase alternating current drive motor providing a rotational torque.

18. A system for monitoring the wear of an axial bearing, the system comprising:

a pump incorporating the axial bearing, the pump having a shaft, said axial bearing including a first member and a second member; the axial bearing changing the coefficient of friction of the first member with respect to the second member during a lifetime of said axial bearing, the first member having a wearing layer covering a frictional layer, the wearing layer eventually being depleted during extended operation of the pump to partially or completely expose the frictional layer to the second member;

a drive motor coupled to said shaft; and load detection means for detecting load changes in a load placed upon the drive motor, said load detection means comprising heat sensing means for sensing an increase in heat associated with the drive motor after the frictional layer is exposed.

19. The system according to claim 18 wherein the heat sensing means comprises a winding temperature monitor, the winding temperature monitor coupled in thermal communication to a winding of said drive motor.

20. The system according to claim 18 wherein the wearing layer includes a plastic resin; the frictional layer including at least one metallic member, and the second member being made from a ceramic material.

21. The system according to claim 18 wherein the wearing layer includes a polymer resin; the frictional layer including at least one metallic member, and the second member being made from a ceramic material.

22. The system according to claim 18 wherein the second member and the wearing layer have a first coefficient of friction if the wearing layer is exposed to the second member, and wherein the second member and the frictional layer have a second coefficient of friction if the frictional layer is exposed to the second member; the second coefficient of friction exceeding the first coefficient of friction.

23. The system according to claim 22 wherein the wearing layer is made from a plastic resin and wherein the frictional layer is made from stainless steel.

24. The system according to claim 18 wherein the first member is substantially annular; an exterior surface of the first member, including the wearing layer, being made partially or entirely from an insulator selected from the group consisting of plastics and polymers.

25. The system according to claim 18 wherein the pump comprises a magnetic-drive centrifugal pump; the axial bearing being product-lubricated by pumped fluid with potentially caustic attributes, said load detection means being oriented with respect to the drive motor to detect heat emanating from the drive motor such that the load detection means is not exposed to the pumped fluid and such that the load detection means does not require seals to contain the pumped fluid.

26. The system according to claim 25 wherein the drive motor has windings and wherein the load detection means is located in the drive motor in proximity to the windings of the drive motor.

* * * * *